United States Patent [19]
Eichstaedt et al.

[11] Patent Number: 6,108,645
[45] Date of Patent: Aug. 22, 2000

[54] METHOD AND APPARATUS FOR EFFICIENT PROFILE MATCHING IN A LARGE SCALE WEBCASTING SYSTEM

[75] Inventors: Matthias Eichstaedt; Qi Lu, both of San Jose, Calif.

[73] Assignee: International Business Machines Corporation, Armonk, N.Y.

[21] Appl. No.: 08/978,737

[22] Filed: Nov. 26, 1997

[51] Int. Cl.[7] .................................................... G06F 17/30
[52] U.S. Cl. .............................. 707/1; 707/10; 707/103
[58] Field of Search ...................... 707/1–10, 100–104, 707/200–206; 364/146, 188; 370/352, 389

[56] References Cited

U.S. PATENT DOCUMENTS

| | | | |
|---|---|---|---|
| 5,428,778 | 6/1995 | Brookes ................................... | 395/600 |
| 5,537,586 | 7/1996 | Amram et al. ........................... | 395/600 |
| 5,583,763 | 12/1996 | Atcheson et al. .................... | 364/551.01 |
| 5,838,965 | 11/1998 | Kavanagh et al. ....................... | 707/103 |
| 5,867,799 | 2/1999 | Lang et al. .................................... | 707/1 |
| 5,875,108 | 2/1999 | Hoffberg et al. ........................ | 364/146 |
| 5,890,152 | 3/1999 | Rapaport et al. ............................ | 707/6 |
| 5,905,988 | 5/1999 | Schwartz et al. ........................ | 707/104 |

OTHER PUBLICATIONS

S. Wu and U. Manber, "A Fast Algorithm for Multi–Pattern Searching", Technical Report TR94–17, Department of Computer Science, University of Arizona, May 1994.

Boyer, R. S., and J. S. Moore, "A Fast String Searching Algorithm", Communications of the ACM 20772, pp. 762–772, Oct. 1977.

Wu S., and U. Manber, "AGREP—A Fast Approximate Pattern–Matching Tool", Usenix Winter 1992 Technical Conference, San Francisco, pp. 153–162, Jan. 1992.

*Primary Examiner*—Ruay Lian Ho
*Attorney, Agent, or Firm*—Gray Cary Ware Freidenrich

[57] ABSTRACT

A method and apparatus for efficiently matching a large collection of user profiles against a large volume of data in a webcasting system. The method removes redundant patterns in user profiles and information content to improve matching performance based on a Boolean-based query language. Users can select desired information content by choosing a set of predicates to assert the properties for each cyberspace document desired. Boolean operators of AND, OR and NOT connect predicates together on the information items that will be pushed to them. The method includes dynamic cost/credit adjustment based profile indexing and matching.

22 Claims, 13 Drawing Sheets

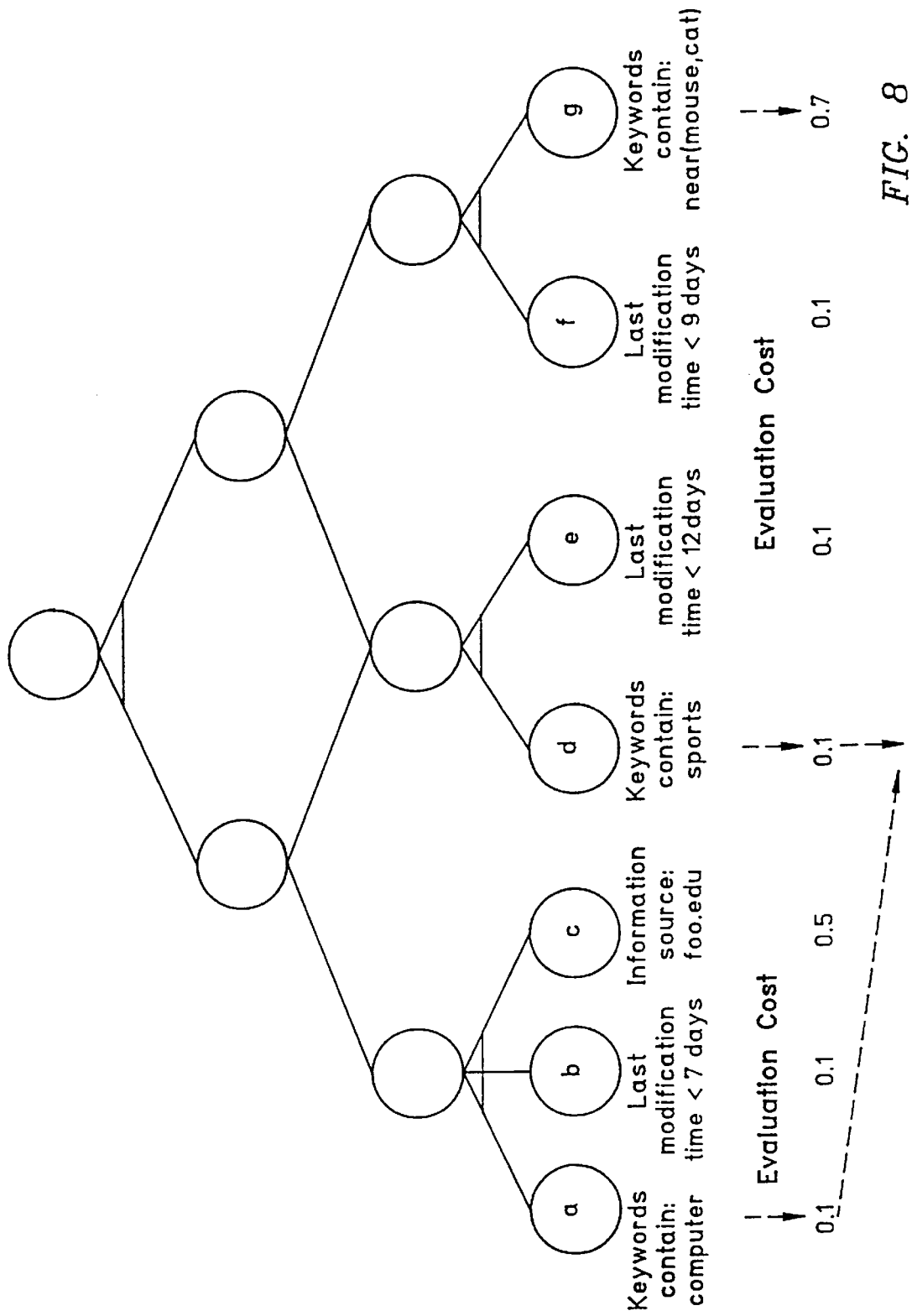

METHOD AND APPARATUS FOR EFFICIENT PROFILE MATCHING IN A LARGE SCALE WEBCASTING SYSTEM

BACKGROUND OF THE INVENTION

1. Field of the Invention

The present invention relates to efficiently managing a large collection of user profiles for matching against a large volume of data. More particularly, the invention concerns a webcasting system which efficiently manages the consumer profiles, matches them to desired data, and efficiently pushes the data to the user.

2. Description of the Related Art

Within the last six months, a new breed of Internet information system called webcasting or "push" systems has attracted enormous attention in the Internet industry. Instead of using a browser to pull information from the Internet, a push system automatically delivers information contents such as news and weather forecast to a user based the user's interest profile. The user's profile is a collection of predicates which identify the type, quantity or quality of information that should be pushed to the user. Because of its tremendous potential for completely changing the shape of the Internet, the battle for leadership has increasingly intensified.

Webcasting technology not only thrives on the Internet, but it can also be effectively applied in corporate intranets to vastly improve business operations and productivity. For example, a sales representative can be constantly alerted with new product information and price updates to better serve his or her customers, or on-line classified ads on apartments for rent can be automatically pushed to corporate employees who are looking for a place to live. Another application of webcasting is that newly issued U.S. patents within designated technology fields can be pushed to the users who are have interests in them.

Currently, information delivered by a webcasting system is typically organized into a hierarchy of content channels. Because of the sheer volume of information in cyberspace, the key to allowing the webcasting technology to realize its full potential is giving users the ability to personalize their information selection and filter out "noise." For example, a user subscribing to the IBM-Almaden-Seminar channel may use a filter to select only those seminars related to database technology. Non-related seminars or "noise" are thereby filtered out. This kind of personalized information content selection is recorded in user profiles and matched against all the information delivered by webcasting.

The common practice in today's Internet information systems is to use traditional database indexing schemes on information contents. User profiles are applied to an information index one at a time. The problem of this approach is that it does not exploit the fact that many of the predicates in user profiles are shared and do not need to be evaluated repeatedly. As a result, current methods do not scale when there is a large number of subscribers because it has to repeatedly evaluate the same predicates.

Cyberspace continues to expand as more and more people gain access to the Internet. This has resulted in exponential increases in user profiles. A critical technical challenge is how to efficiently match a large collection of user profiles against a large volume of information content when a webcasting system is deployed in a corporate intranet or on the Internet with an unlimited number of subscribers. What is needed is an invention that can be used to efficiently match a large collection of user profiles against a large volume of data.

SUMMARY OF THE INVENTION

Broadly, the present invention solves a new technical challenge posed by the recent emergence of webcasting systems: how to efficiently match a large collection of user profiles against a large volume of data and to deliver the data to each user matching the profile.

In one embodiment, the invention may be implemented to provide a method to remove redundant patterns in user profiles and information content to drastically improving matching performance. The invention employs a Boolean-based query language so that users can select desired information content that expresses their interest profile. Specifically, a user chooses a set of predicates to assert the properties of each of the documents in the cyberspace and uses the boolean operators of AND, OR and NOT to connect those predicates together on the information items that will be pushed to them. A profile is a set of predicates connected by Boolean operators AND, OR and NOT.

For example, a user subscribing to channel Almaden-Seminar may be only interested in text documents containing the keyword "database." The user uses the following sample profile to express such a requirement: "Channel==Almaden-Seminar AND Contain(database) AND Media-type==text." where each predicate evaluates to True when it is matched against a document containing the desired information.

This invention is designed to operate in a webcasting system where a collection of user profiles is maintained. The invention may incorporate a profile engine that matches all the user profiles against any information item before it is pushed to the corresponding user. This invention also minimizes the performance cost of matching a collection of user profiles against a sizable amount of data. The method involves exploiting redundant patterns in both user profiles and data to avoid any unnecessary computation and includes dynamic cost/credit adjustment based profile indexing and matching.

One method employed by the invention is profile indexing used to enhance performance for searching patterns in text documents. The basic idea is to build an index for shared patterns to speed up a search. For example, when a large number of users subscribe to a webcasting system many of the predicates in user profiles will be identical simply because people have common interest, that is, dog owners will visit sites of interest to dog owners. Statistically, many dog owners will share similar likes and dislikes. The invention extracts all the shared "likes" or predicates as well as their Boolean compositions among a large collection of user profiles using a directed acyclic graph (DAG) and a priority heap in the preferred embodiment as the basic data structures. This enables the collection of profiles to be evaluated against any information item without repeated evaluation of shared predicates.

Another method employed is to assign and dynamically adjust the cost/credit information for each leaf node—a leaf node in the DAG architecture corresponding to a predicate—of the profile index and employ the cost/credit information to minimize performance cost. The order in which predicates are evaluated is important to overall performance of this method. For example, consider the Almaden-Seminar profile described above matched against an audio file. If the low-cost predicate Media-type==text is evaluated first, it can quickly be decided that the profile does not match with the information item even without evaluating the other predicates. However, if the predicate Contain (database) is evaluated first, substantial computation time is wasted trying to find the keyword "database" in an audio file.

The present invention also includes a comprehensive scheme for dynamically —and accurately monitoring and adjusting the cost and credit value for each predicate. The profile engine will evaluate the predicates in an order that is based on a combination of the cost and credit value. This enables the profile engine to achieve near optimal performance, that is, the profile engine can learn over time. Because of the dynamic nature, the profile indexing and machining mechanisms in one embodiment quickly adjust to changes in user profiles and information feeds to maintain high performance. The present invention mechanisms also extend the dynamic cost/credit based profile indexing mechanisms to match against a collection of indexed information items to further improve performance.

Another method of the invention is utilizing multi-patten matching on text predicates. A large portion of the current cyberspace are text-based documents. Therefore, many predicates in the profile collection are text predicates asserting certain text patterns in the documents. This method allows multi-pattern text searching to be utilized to further exploit performance advantages.

In another embodiment, the invention may be implemented to provide an apparatus capable of efficiently matching a large collection of user profiles against a large volume of data and delivering the data to each user fitting the profile.

In still another embodiment, the invention may be implemented to provide a signal-bearing medium tangibly embodying a program of machine-readable instructions executable by a digital data processing apparatus to perform method steps for efficiently matching a large collection of user profiles against a large volume of data.

The invention affords its users with a number of distinct advantages. One advantage is that the invention provides a scalable method to match a large collection of user profiles against a large volume of data. Due to the shared representation of common predicates in a profile index, adding more subscribers will have a negligible effect on the overall performance of the profile matching process.

Another advantage is adaptability. The methods of this invention can adapt to changes in user profiles and information feeds to maintain efficient performance. As mentioned above, the invention is directed towards information push methods, but it can also be applied in notification, alert, or other kinds of information push systems using a Boolean-based profile language.

One more advantage is performance. The techniques employed by the invention efficiently utilize dynamic cost/credit information and a logical structure among predicates to achieve high performance over time. In essence, the invention learns as it goes along.

The invention also provides a number of other advantages and benefits, which should be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, and wherein:

FIG. 8 shows a graph used to explain a predicate evaluation method used in accordance with the present invention;

DETAILED DESCRIPTION OF THE PREFERRED EMBODIMENTS

The nature, objects, and advantages of the invention will become more apparent to those skilled in the art after considering the following detailed description in connection with the accompanying drawings. As mentioned above, the invention concerns a method and system for efficiently matching user profiles with desired information.

HARDWARE COMPONENTS & INTERCONNECTIONS

Figure 1:
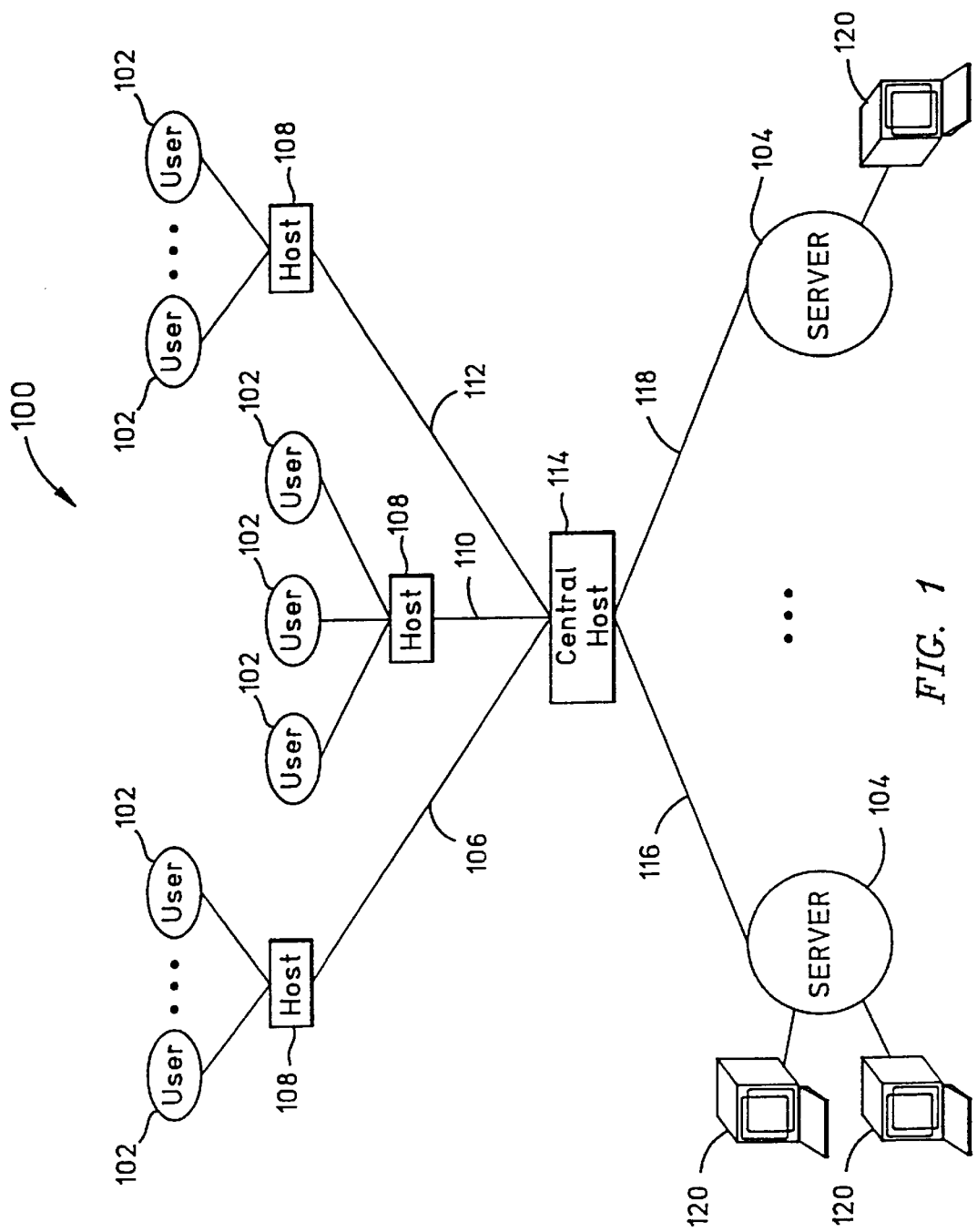
FIG. 1 is a block diagram of the hardware components and interconnections of a network used to transfer information in accordance with one embodiment of the invention.

One aspect of the invention concerns a webcasting, system 100, which may be embodied by various hardware components and interconnections as described in FIG. 1.

The webcasting system may be composed of several independent communicatively-connected functional components. The system 100 may comprise a large number of clients, where each client uses a user interface 102 that is continually updated with information that matches a profile specified by a user. The user interface may be a programming interface or a graphic users interface (GUI), similar to that widely used by push-client vendors. The interface 102 allows a user to specify an address in the webcasting system that may contain information that matches a particular user-specified profile. For instance, a user could define a webcasting location that contains local traffic reports from a public Web server. Any time a traffic report is updated, a copy of the report or a short summary appears on the user interface. In order for the summary to appear, the user interface 102 may be communicatively-connected to a host 108 which is turn may be connected to a central host 114. The hosts communicate with a profile handler 306 and profile matcher 308 embodied in the webcasting system 100 and shown in FIG. 3.

Figure 2:
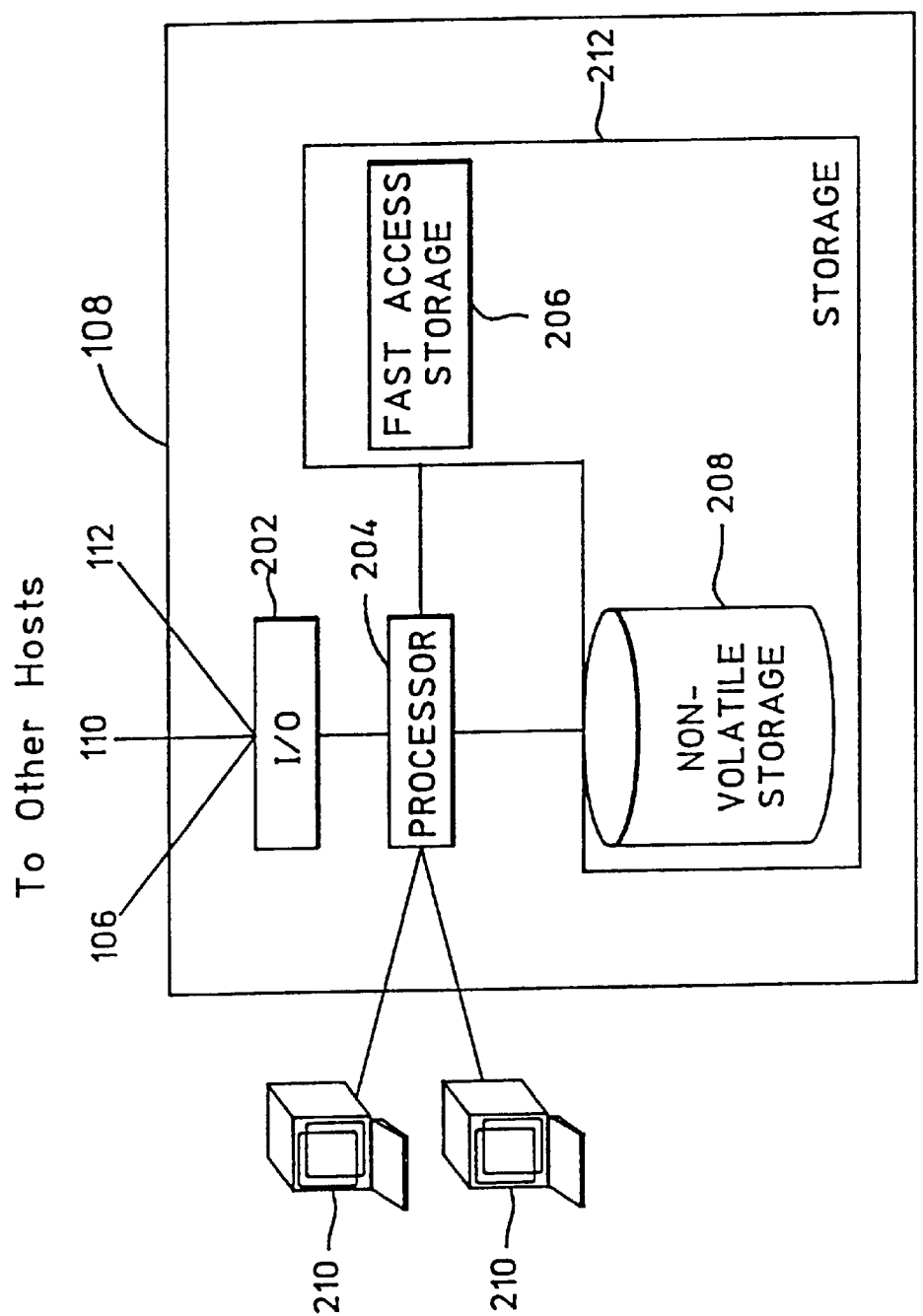
FIG. 2 is a block diagram of a digital data processing machine shown in FIG. 1 in accordance with the invention.

As shown in FIG. 2, any host may include a processor 204, such as a micro processor, application specific hardware, or other processing machine, coupled to a storage 212. In the present example, the storage 212 includes fast-access-storage 206 as well as non-volatile storage 208. The fast-access-storage preferably comprises random access memory, and may be used to store the program instructions executed by the processor 204 during such execution. The non-volatile storage 208 may comprise, for example, one or more magnetic data storage disks such as a "hard drive", a tape drive, or any other suitable storage device. A host may also include an input/output (I/O) 202 such as a line, bus, cable, electromagnetic link, communication channel, interface or other means for exchanging data with the processor 204. The I/O 202 may be communicatively-linked to lines 106, 110 and 112. The communicative links 106, 110 and 112 may be of similar configuration as that of I/O 202. A host may include a display 210 for displaying the user interface 102, and may comprise a video monitor, printer, memory, or any type of display suitable for displaying a user to interface.

As shown in FIG. 1, the central host 114 is connected to one or more servers 104 via communication channels 116 and 118. These communication channels may be a line, bus, cable, electromagnetic link, or any other means used for exchanging data between a user 102 and a server 104. The server 104 may contain a digital processing apparatus, storage, a database, or various other apparati commonly used in Internet server sites. A server 104 of the webcasting system 100 may include a profile system 300 shown in FIG. 3 and used to match a client's specified profile with information located on the server 104.

Figure 3:
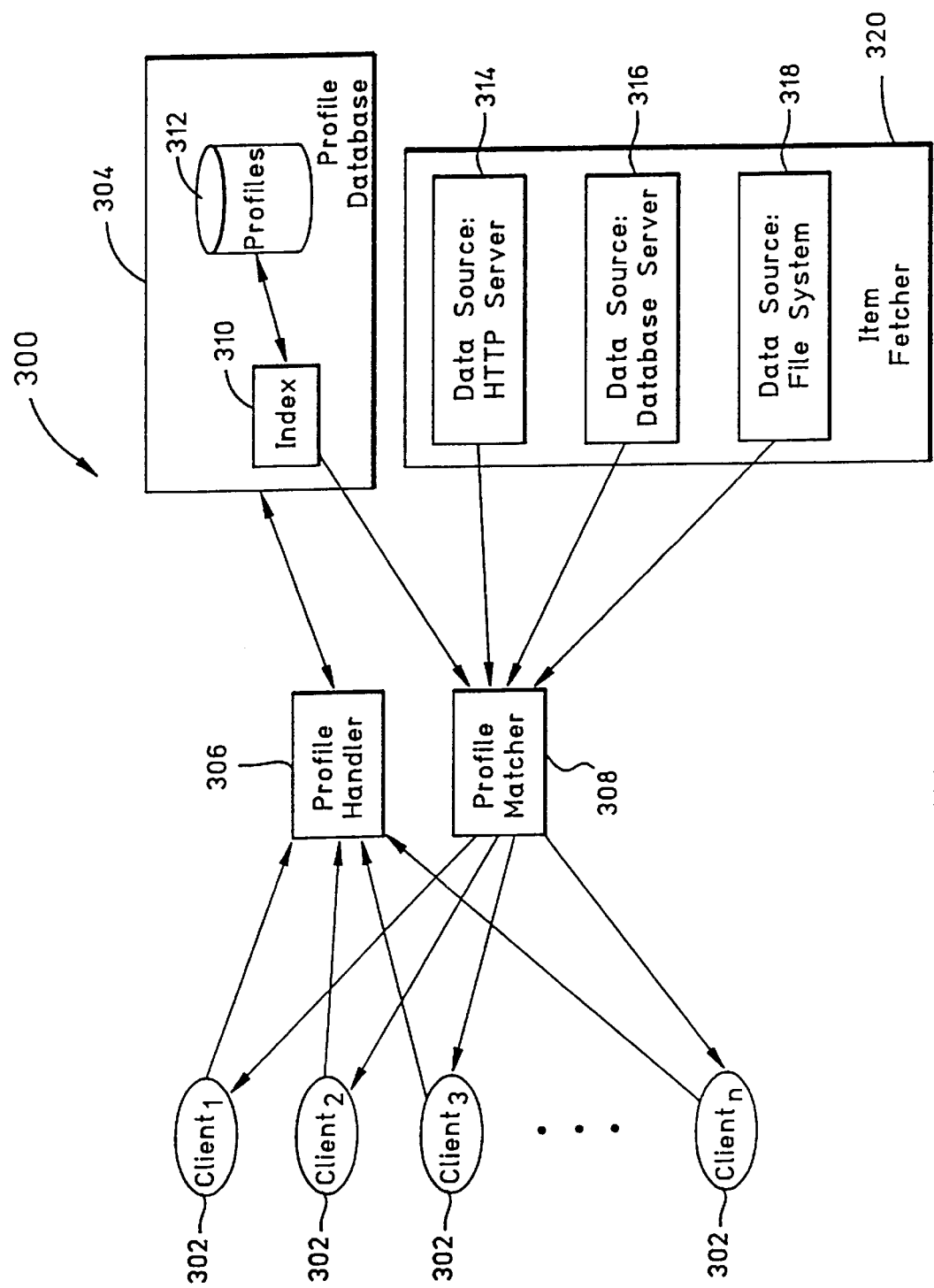
FIG. 3 is a block diagram of a profile matching system for a large-scale webcasting environment in accordance with the invention.

In FIG. 3, one or multiple clients 302—each which access the profile system 300 through the user interface 102 shown in FIG. 1—communicates with a profile handler 306 and a profile matcher 308. The system 300 may logically include one or more profile handlers 306. Each profile handler receives specified profiles from a client. Clients 302 are represented as clients 1 through $_n$, where n equals the total number of clients having access to the system 300. Once a profile is received from a client, the profile is stored in the profile database 304. If a client 302 is a new user to the profile system 300, the new client can be registered with the system, and existing profiles contained within the profile database 304 are updated.

Registration may be by both open and closed registration. Open registration allows a new user to connect to the profile handler 306 at any time to create a new account on his or her behalf. The new account is then stored in he profile database 304. Because the overhead to the database 304 for open registration is minimal, any user can create an unlimited number of accounts within a profile. Closed registration refers to all accounts for regular users which must be created by an administrator of the profile handler 306. The administrator (not shown) initializes new accounts and provides a password for every new user, and may be contained within the profile handler or the server 104. The administrator and the profile handler 306, are communicatively-coupled to the profile database 304 and data sources 314–318.

The profile system 300 may also include one or more profile matchers 308. A profile matcher compares each information item against each user profile. In other words, each item of information relating to the traffic data referred to in the example above would be matched to each user profile requesting such traffic information. The profile matcher 308 output may be a sequence of tuples in the preferred embodiment that consists of a data pair comprising an information item and a profile-ID item. These tuples are sent to the matching client 302 which in turn displays the tuple to the user interface 102. In the preferred embodiment, the profile matcher 308 updates its internal data structure whenever changes to the profiles are made and recorded in profile database 304.

One or more item fetchers 320 may be included in the profile system. An item fetcher 320 may comprise different forms known to those schooled in the art depending on the type of data that is to be distributed by the profile system 300. For example, FIG. 3 shows an item fetcher 320 for a HTTP server, a DATABASE server and for a FILE SYSTEM server. The item fetcher 320 is communicatively-coupled to the profile matcher 308 and each of the components contained therein collect data from a variety of data sources. In the preferred embodiment, the item fetcher 320 periodically delivers a set of information items to the profile matcher 308. In another embodiment the item fetcher 320 delivers information sets only when requested by the profile matcher 308. The item fetcher may comprise an apparatus such as shown in FIG. 2 for a host 108, or may be integral to the structure of a server 104 shown in FIG. 1.

Despite the specific foregoing description, ordinarily skilled artisans having the benefit of this disclosure will recognize that the apparati discussed above may be implemented in machines of different construction, without departing from the scope of the invention. As a specific example, the non-volatile storage component 208 of FIG. 2 may be eliminated or replaced by tape storage; furthermore, the fast-access-storage 206 may be provided on-board the processor 204, or even provided externally to a host 108. Also, one schooled in the art will readily understand that various processing configurations may be used for the profile handler 306 and the profile matcher 308 to perform their respective processing machinations. For example, the profile handler 306 and profile matcher 308 may be configured similarly to a host apparatus as shown in FIG. 2.

OPERATION

In addition to the various hardware embodiments described above, a different aspect of the invention concerns a method for efficient profile matching in a large scale webcasting system.

Signal-Bearing Media

In the context of FIGS. 1 through 3, such a method may be implemented, for example, by operating the profile system 300, as embodied by a digital data processing apparatus contained within the webcasting system 100, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to match user specified profiles with desired information.

Figure 4:
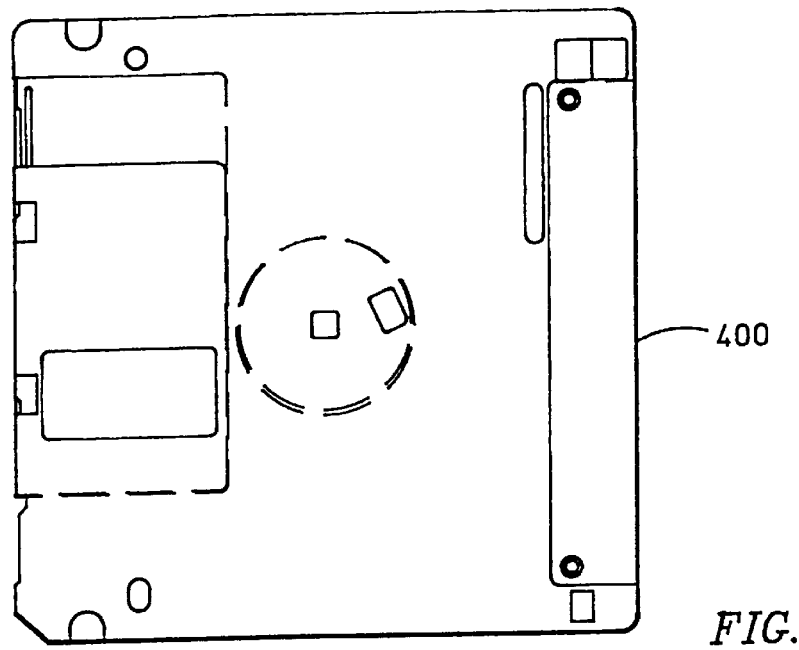
FIG. 4 shows an exemplary signal-bearing medium in accordance with the invention.
Figure 5:
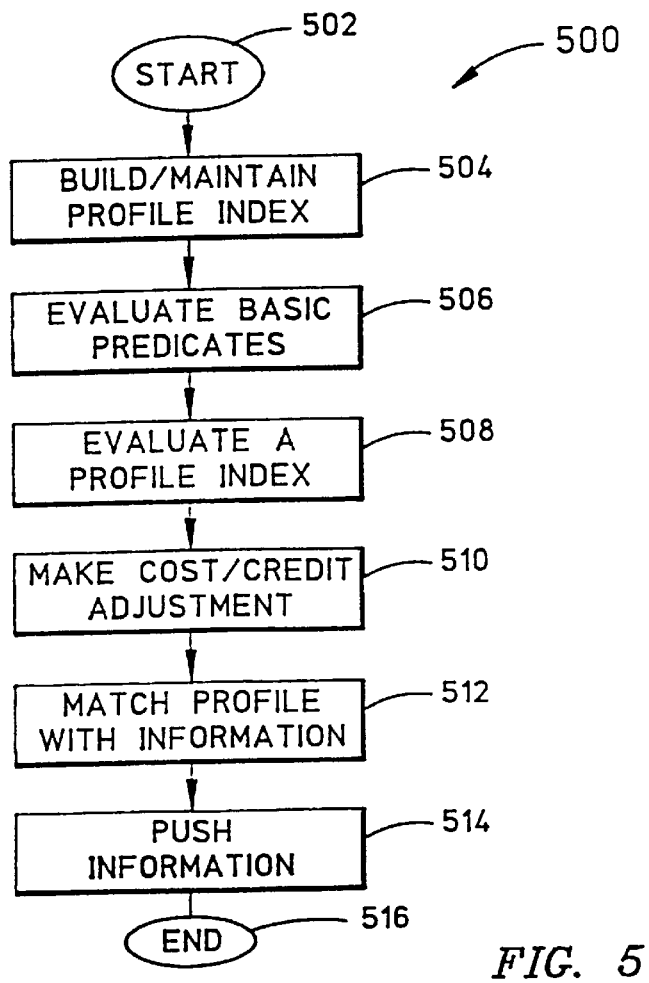
FIG. 5 is a flowchart of an operational sequence for efficient profile matching for the large-scale webcasting environment in accordance with one embodiment of the invention.

This signal-bearing media may comprise, for example, RAM (not shown) contained within the webcasting system 100. Alternatively, the instructions may be contained in another signal-bearing media, such as a magnetic data storage diskette 400 shown in FIG. 4 and contained within a server 104 or a host 108, and directly or indirectly accessible by the profile system 300. Whether contained in the system 100 or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape), paper "punch" cards, or other suitable signal-bearing media including transmission media such as digital and analog, and communication links and wireless. In an illustrative embodiment of the invention, the machine-readable instructions may comprise software object code, compiled from a language such as C, C-compatible, or other programming language commonly used for programming with respect to the present invention's environment Overall Sequence of Operation FIG. 5 shows a sequence of method steps 500 to illustrate a general example of the method aspect of the present invention. For ease of explanation, but without any limitation intended thereby, the example of FIG. 5 is described in the context of the webcasting system 100, and more particularly the profile system 300, described above.

The method of invention allows for scalability and improved performance in large-scale profile matching systems such as found on a server 102 (FIG. 1) commonly used by Internet information providers (Provider). Because most subscribers to a Provider share similar interests with other subscribers to the same Provider, many of the basic predicates specified in a large collection of user profiles are shared by a number of users. The present invention takes advantage of this relational fact beginning in step 502, when the method of the present invention is employed, for example, in a server 104.

A profile index is built and maintained in step 504 with a complete collection of user profiles for each basic predicate appearing only once. This allows any basic predicate to be evaluated at most once during the entire processing of matching the complete profile database against an information item without repeatedly evaluating the same basic predicate belonging to multiple profiles. By allowing a basic predicate to only be evaluated once for an information item, the profile matching mechanism of the present invention scales well. Adding a new user profile will have negligible negative affect because most of the basic predicates in the new profile are very likely already represented in the profile index.

Figure 6:
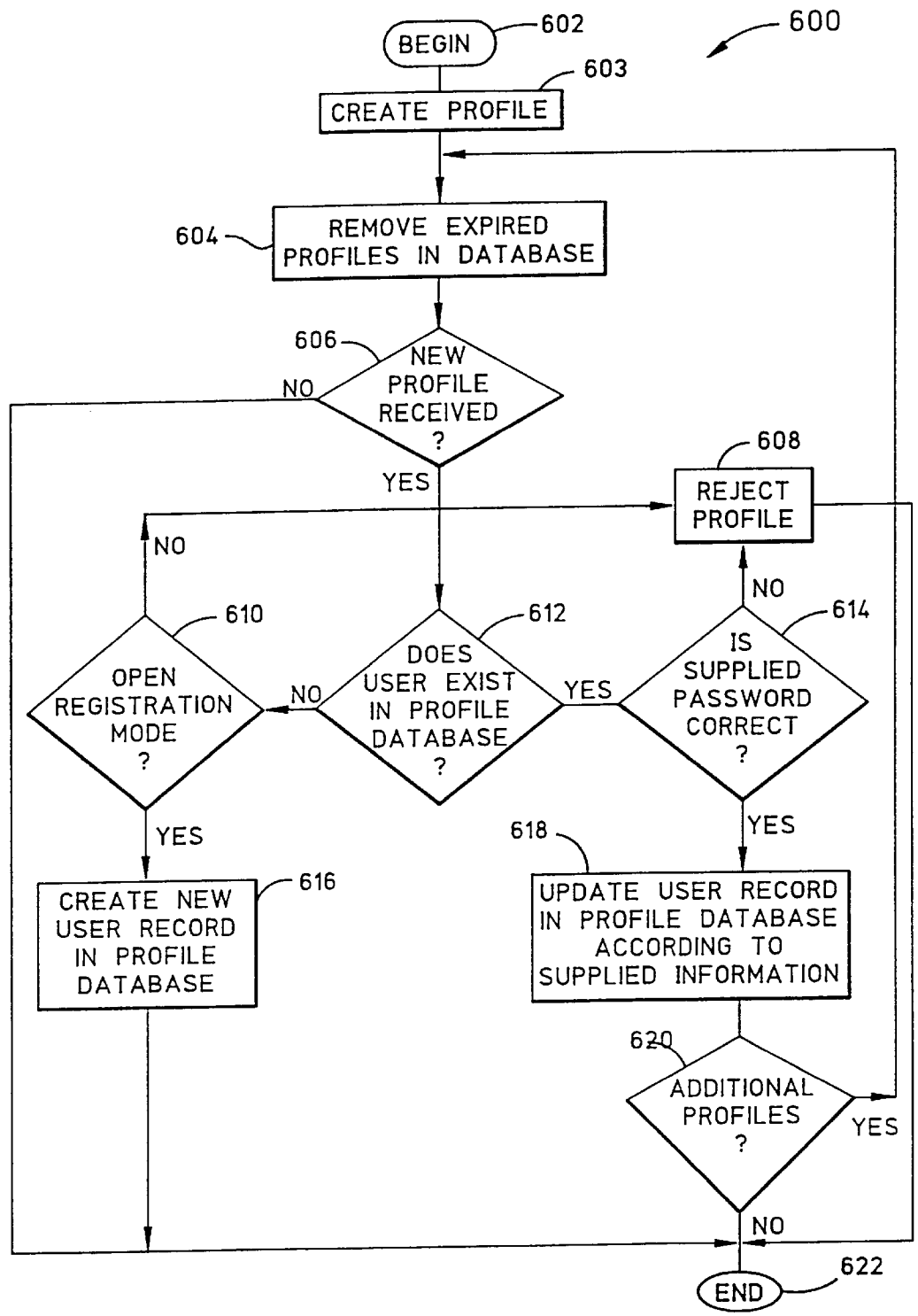
FIG. 6 is a flowchart of an operational sequence for a profile handler used accordance with the invention.

The underlying data structure for building and maintaining the profile index is a DAG, widely used in managing data and known to those schooled in the art. Every leaf node of the DAG—a leaf node being a node without out-going links—correspondences to a basic predicate. Hereafter, the term basic predicate and leaf node will be used interchangeably unless otherwise specified in discussing the rest of the invention. Because every internal node corresponds to a Boolean operator of AND, OR or NOT, the data structure is a AND-OR-GRAPH (AOG). The AOG has a special root node that does not have any incoming links. Each child node of the root node represents one or more user profiles. Within each profile resides the user specified predicates, or leaf nodes. Building and maintaining a profile index is discussed in detail below and in reference to FIG. 6.

After a profile index has been built and maintained in step 504, the basic predicates of the index are evaluated in step 506. Evaluation of the basic predicates involves the matching of the user-specified predicate with the information defined by the predicate. However, in performing the evaluation method of step 506, the matching must take place within a finite amount of time. Additionally, the computation cost of any instance of applying a basic predicate to an information item can always be obtained. The computation cost is represented in the form of a numerical value that reflects the amount of computation resources spent by the evaluation process, which may include processor, memory, I/O, disk space and other associated costs of evaluating the basic predicate.

Evaluation of a profile index in step 508 is a method of evaluating a profile index to obtain a truth-value for every predicate of the profile index and to propagate the value upward through the internal nodes of the DAG representing the profile index all the way to the root node. Some of the leaf nodes encountered during the propagation to the root node may not be evaluated because the evaluation of an associated node may make a given leaf node inconsequential to the profile-matching outcome. These nodes are designated "DontCare." In the following detailed discussion, a leaf node having a value of DontCare is not evaluated when evaluating a profile index, but is considered "conceptually" evaluated.

A cost credit adjustment may be made in one embodiment in step 510. This dynamic cost/credit adjustment exploits the Boolean structure found within a user profile. Conceptually, the logical process of matching a user profile against an information item is to apply the Boolean expression of the profile to the information content of the item and decide whether the outcome is True or False. However, deciding whether a profile is True or False with respect to any information item does not require an evaluation of every basic predicate of the profile. For example, suppose a user profile is a Boolean expression Media-Type==text and Channel==Almaden-Events. If first predicate is evaluated to FALSE, the entire profile can be evaluated to False without checking the second predicate. In other words, the evaluation of the first predicate will cause the second predicate to become a DontCare whose value does not affect the outcome of the profile matching. This invention takes advantage of this fact and skips over DontCare predicates.

Obviously, the order in which the basic predicates are evaluated affects the overall performance evaluation. The present invention includes a method that can dynamically adjust the evaluation order of the predicates based on the computation cost for each predicate. Over time the present invention achieves the best overall performance by evaluating only the "cheap" predicates while avoiding the "expensive" predicates which require additional computation time. In an alternative embodiment, the present invention skips over as many DontCare predicates and avoids as many expensive predicates as possible. The dynamic nature of the cost/credit adjustment of step 510 automatically adjusts the method of the present invention to different kinds of information feeds.

Profiles are matched with each other and with the information fitting the profile in step 512. Whenever a new information is received, a bottom-up evaluation is made through the profile index. Bottom-up refers to beginning at the bottom of the DAG and proceeding to the root node of the DAG. Every leaf of the profile index is evaluated to obtain its current Truth-value. Again, the Truth-value is propagated upward to the root node. The Truth-value of each node representing user profiles is then known and matched to a given information item. The information, once matched to a profile, is pushed to the user in step 514. After the information is pushed, the method ends in task 516.

In order to better understand the present invention, a discussion of the query language for profile specification follows.

Query Language for Profile specification

A user profile is a persistent query that specifies the kind of information that is of interest to the user and the query language used dictates the way users specify their profile. This invention assumes a Boolean-based query language where each profile is a set of basic predicate connected by Boolean operators. The invention requires the basic predicates to yield a Truth-value of either True or False when they are applied to an information item. For example, a basic predicate can be in the form of "media-type==text" or "channel==Almaden-Events", where the first predicate requires an information item to be represented in text whereas the second predicate requires it to be from channel==Almaden-Events.

The fact that no special property on the basic predicates in the query language is required gives this invention wide applicability. For example, it can be effectively applied to systems where only basic text predicates are used, and to systems employing a rich set of basic predicates that allows the users to select fine-grain features of an information item such as color and shape in images.

Although a general discussion of the preferred embodiment of present invention has been made above in regard to FIG. 5, a more detailed discussion of each step follows. Furthermore, the method is very adaptable and extensible. For example, the method can effectively be used to match a profile against a set of indexed information items to take advantage of an existing data index. This obviously speeds up the matching process because each data item does not need to be evaluated; only the item identifier contained in the existing data index. The method can also implement multi-predicate evaluation techniques to enhance performance.

1. Build/Maintain Profile Index

The initial state of the profile index referenced in step 504 of FIG. 5 is best visualized as a graph with only one node—the ROOT. However, building and maintaining a profile index after it has been initialized in step 602 includes creating a profile, and may include adding a new profile, removing a profile, updating an existing profile, or sharing internal nodes of the profile.

a. Creating a Profile

To create a profile (P) in a profile index in step 603, a new child C of the ROOT must be created for P. New child C is then assigned a profile ID based on the user ID and his or her channel selection, assuming that a profile with this particular ID does not currently exist in the profile index. If an identical ID already exists, it must be removed before inserting the new profile. Based on the Boolean composition of P, the profile index is expanded as follows.

If P is in the form of P1 AND P2 AND . . . AND Pn, P is marked as an AND node. For each sub-expression Pi (i=1, . . . , n), a check is performed to see if Pi is a basic predicate or not. If Pi is already a basic predicate, then a check is made to find out if the same predicate is already in the profile index. If so, a new link is inserted so that P will point to that node as one of its children. If not, a new leaf node for Pi is entered into the profile index as the child of P. If Pi is not a basic predicate, the same graph expansion process is used recursively.

If P is in the form of P1 OR P2 OR . . . Pn, P is marked as an OR node. The remaining steps of handling P1, . . . , Pn is the same as if P is an AND node as discussed above.

If P is in the form of NOT P1, P is marked as a NOT node and the remaining steps of handling P1, . . . , Pn is the same as if P is an AND node as discussed above. However, the node of P for the unary operator NOT may not be expanded. In this case, a tag is placed on the node P to indicate that its Truth-value should be reverted. If profile P has only one single node, special consideration is needed because a profile node cannot hold a basic predicate. In this case, a new child C of ROOT is created as described above, where C is an AND or an OR node. A new leaf node is initialized which holds the basic predicate of P. This leaf node becomes the only child of the new profile node. If the profile index already has a leaf node with the requested predicate, the same steps of handling P1 . . . Pn discussed above is used and the existing leaf node is shared.

In the preferred embodiment a reference of all leaf nodes that have been inserted or shared during the steps above are kept in a separate data structure. This data structure allows efficient access to all relevant leaf nodes for a new profile. The optimization and normalization steps which may also be used in one embodiment are discussed below with respect to sharing nodes.

b. Removing an Existing Profile

If an existing file needs to be removed, removal is performed similarly to traversing and removing links rooted at P. For each node visited during the traversal of step 604, the link between that node and its parent node is removed. If any node encountered in the process has zero incoming-links, that node is also removed.

If a new profile is received in step 606, the method handles processing of a new profile depending upon whether or not the user requesting the profile currently exists in the profile database. If a no new profile is received then the method ends in step 622. If the user requesting a new profile does not exist in the database in step 612, then a determination is made in step 610 as to whether open or closed registration mode is being used. If open registration mode is not being used, the profile is rejected in task 608 and the method ends in step 622. If the method is using open registration in task 610, then a new user record is creater in the profile database in task 616. The method then ends in step 622. Open registration and closed registration are discussed above.

If the user requesting the new profile does exist in the profile database in step 612, then a password may be required in step 614 in order for the new profile to be received into the profile database. If an incorrect password is supplied in step 614, the profile is rejected in step 608 and the method ends in step 622. However, if the supplied password is correct, the user record in the profile database is updated according to the supplied information in step 618. Updating a user record may comprise changing information contained in a current record or creating a new user profile as requested. If the user requested additional profiles in step 620, then the method repeats beginning with task 604. If no additional profiles have been requested, the method ends in step 622.

It is expected that users will update their profiles to adjust for their changing needs for information feeding. A simple way to update an existing profile in the profile index is to remove that profile and then add a new profile as discussed above. In order to optimize the method 600 discussed with respect to FIG. 6, internal nodes may be shared by the method.

c. Sharing Internal Nodes

An optimization to significantly reduce the size of the profile is to share internal nodes in the profile index. It is quite possible that many users will share the same interests on certain topics and therefore end up using the same Boolean expression at different levels of their profiles. It may also be true that multiple users will have identical profiles. To exploit this kind of profile redundancy, internal nodes are shared in the profile index in the preferred embodiment.

This is done by executing the following steps immediately after a new profile is added to the profile index in step 603 or 606. First, after a new profile P is added, the data structure that holds the new leaf nodes is inspected. This data structure contains references to all new or newly shared leaf nodes and is built when a new profile is added. For every leaf node from this data structure, the leaf node itself and all its predecessors are recursively analyzed to identify and eliminate as many redundant nodes as possible. A node in a profile index is redundant if the index can be restructured and the particular node can be eliminated without changing the semantics of any of the profiles in the index. If the leaf nodes are already shared, a new profile is inserted, and an optimization operations is performed.

Figure 7A:
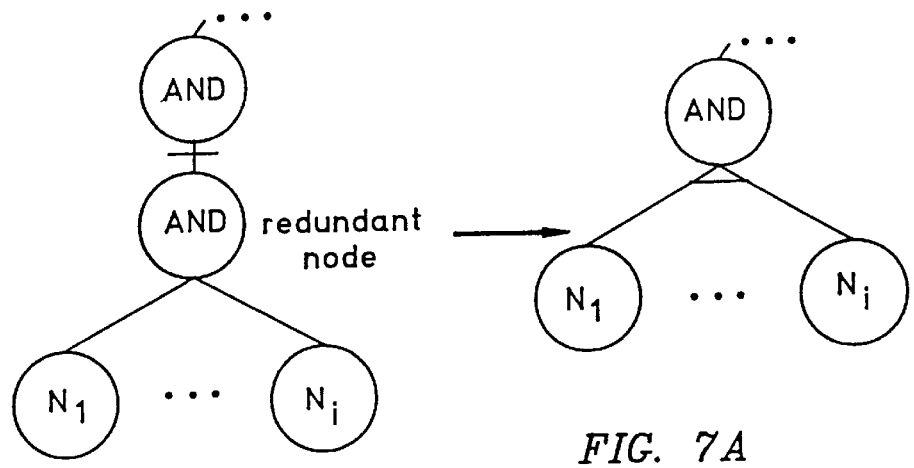
FIGS. 7A–7C illustrate graphs used to distinguish data using AND nodes from OR nodes as used in accordance with the invention.
Figure 7B:
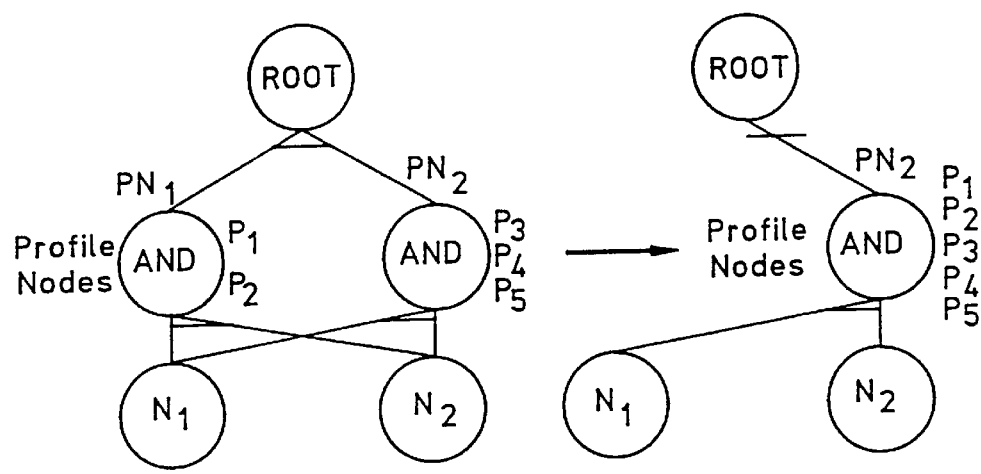
Figure 7C:
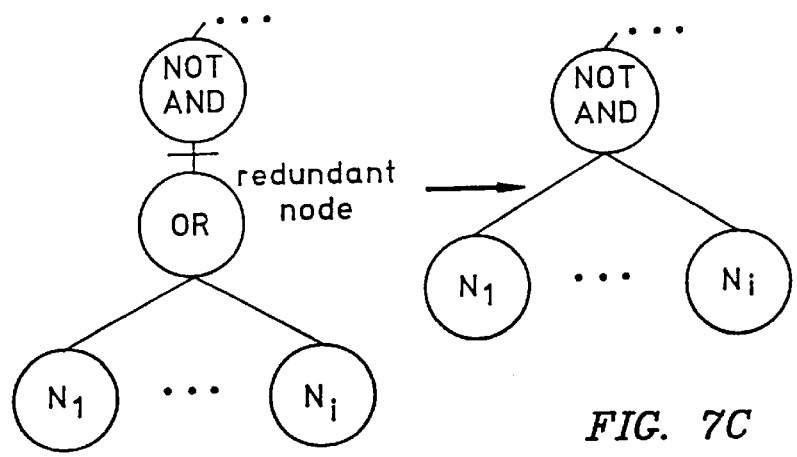

To and in understanding the optimization operations, FIGS. 7A–7C show these optimization situations. To distinguish AND nodes from OR nodes in these figures, the arcs in the graph from an AND node to its successors are joined by a horizontal line. For purpose of discussion, let N be a node currently being examined.

A first optimization operation is shown in FIG. 7A. N is redundant if N is an inner node and N has only one parent of the same type and the parent has only one child node. In this case the child N can be eliminated and all successors of the child N become successors of the parent node. This also applies for AND, NOT AND, OR and NOT OR nodes.

Another optimization operation is illustrated in FIG. 7B where parent nodes are marked as $PN_n$, and profiles as $P_n$. If N has two identical parents then one of the parent nodes is redundant. Identical means that two nodes are of the same type (AND, OR, NOT AND, NOT OR) and their successors are the same. Also, either both or none of them must be a profile node. In case both nodes are profile nodes, the profile IDs from one node must be copied over to the other node. A list of profile IDs is associated with each profile node. This list contains the names of profiles that share this node. Assume PN1 and PN2 are identical parents. In this situation it is determined which parent node has fewer parent nodes (by comparing the p-count values). If PN1 has fewer parent nodes redirect all parents of PN1 to PN2 are redirected and PN1 is eliminated.

Yet another optimization operation is shown in FIG. 7C. A NOT/AND node with one child can be eliminated by adding the NOT attribute to its child. The same is true for NOT/OR. It is important for this optimization rule that the NOT/AND or NOT/OR node have only one child.

After the optimizations shown in FIGS. 7A–7C have been applied to the profile index, the evaluation process may be rendered more efficient. In particular, if a new profile P1 is identical to an existing profile P2, then the node P1 will end up being merged with P2. If this node is evaluated to be true for an information item, that means all the profiles associated with this node are satisfied by the information item.

2. Evaluating Basic Predicates

Step 506 of FIG. 5 addresses evaluating basic predicates. The present invention employs to methods for dealing with these evaluations.

a. Evaluating a Single Basic Predicate

The present invention does not require any special method for evaluating a basic predicate and may be evaluated on an individual basis using the group evaluation method discussed below. However, two basic requirements to evaluating basic predicates must be followed. First, the Truth-value of a basic predicate when applied to any information item must always been obtained within a finite amount of time. In other words, if the Truth-value cannot be contained within a designated period of time, the predicate is not evaluated. Second, the computation cost of any instance of applying a basic predicate to a specific information item can always be obtained. Computation cost is represented in the form of a numerical value reflecting the amount of computation resources spent on the evaluation process. This computation time may include costs for the processor, memory, I/O, disk space, etc.

b. Group Evaluation of Basic Predicates

Basic predicates do not have to be evaluated one at a time. Depending on the nature of the predicates, evaluating a group of predicates at once may yield superior performance. The basic profile-matching process of this invention is very flexible and can easily accommodate the grouping of a set of basic predicates into a single unit to be evaluated together against an information item. The criteria for selecting a predicate group depend very much on the nature of the predicates and their integration with the overall dynamic cost/credit-based evaluation process. Such kind of integration can be done by assigning different predicates into one or more evaluation groups before evaluating a specific information item.

As an example, consider text predicates that require a text document to satisfy certain properties. The evaluation of a text predicate is equivalent of finding a specific text pattern in the document. In other words, a text predicate can be viewed as asserting a text pattern. As discussed in S. Wu et al., "A Fast Algorithm for Multi-Pattern Searching", *Technical Report TR*94-17, Department of Computer Science, University of Arizona, May 1994, R. S. Boyer et al., "A Fast String Searching Algorithmh", *Communications of the ACM* 20, pp. 762–772, October 1977, and S. Wu et al. "Agrep—A Fast Approximate Pattern-Matching Tool", *Usenix Winter 1992 Technical Conference,* San Francisco, pp. 153–162, January 1992, each of which is incorporated by reference, finding multiple text patterns in a document is often more efficient than finding one pattern at a time.

For example, consider the situation of FIG. 8 which illustrates a profile index with multiple leaf nodes holding text predicates. In this case node a, d and g are text predicates. All predicates have a hypothetical computation cost value assigned to them and shown as 0.1, 0.6 and 0.7, respectively. Initially, only the leaf nodes with the lowest cost value are evaluated. In this case, node a and node d are evaluated. The predicate of node g would not be evaluated because it has a higher cost value, that is, it contains a more advanced text pattern that is difficult to match.

Once this match has been completed the Truth-value of all involved leaf nodes is known and propagating the Truth-value using the method described below may start. Using this approach, more leaf nodes may be evaluated than necessary because every "single" leaf node does not need to be evaluated. Nevertheless, the performance improvements of using multi-predicate matching is significant for common data types such as text. Therefore, for many applications it pays off to over-evaluate leaf nodes.

After the basic predicates have been evaluated, the profile index is evaluated in step 508. To evaluate a profile index, the following attributes for each node of the profile index are defined as:

a) value: this is the Truth-value of a node. It can take True, False, DontCare, and UnKnown with the initial value set before the profile matching process starts;

b) p-count: the number of parent nodes for this node. It is also the number of incoming links;

c) c-count: the number of child nodes for this node. It is also the number of outgoing links;

d) pvk-count: the number of parent nodes whose truth-value is already known, and is initially set to 0;

e) cvk-count: the number of child nodes whose truth-value is already known, and is initially set to 0;

f) cost: a numeric value that indicates the average computation cost of the predicate that corresponds to this node. The same predicate may require different computation costs when applied to different information items. Therefore, a meaningful metric is the average computation cost; and g) credit: a numeric value that reflects the average amount of computation cost that can be avoided because of the evaluation of the predicate corresponding to this node (because some other nodes will be marked as DontCare).

Figure 9:
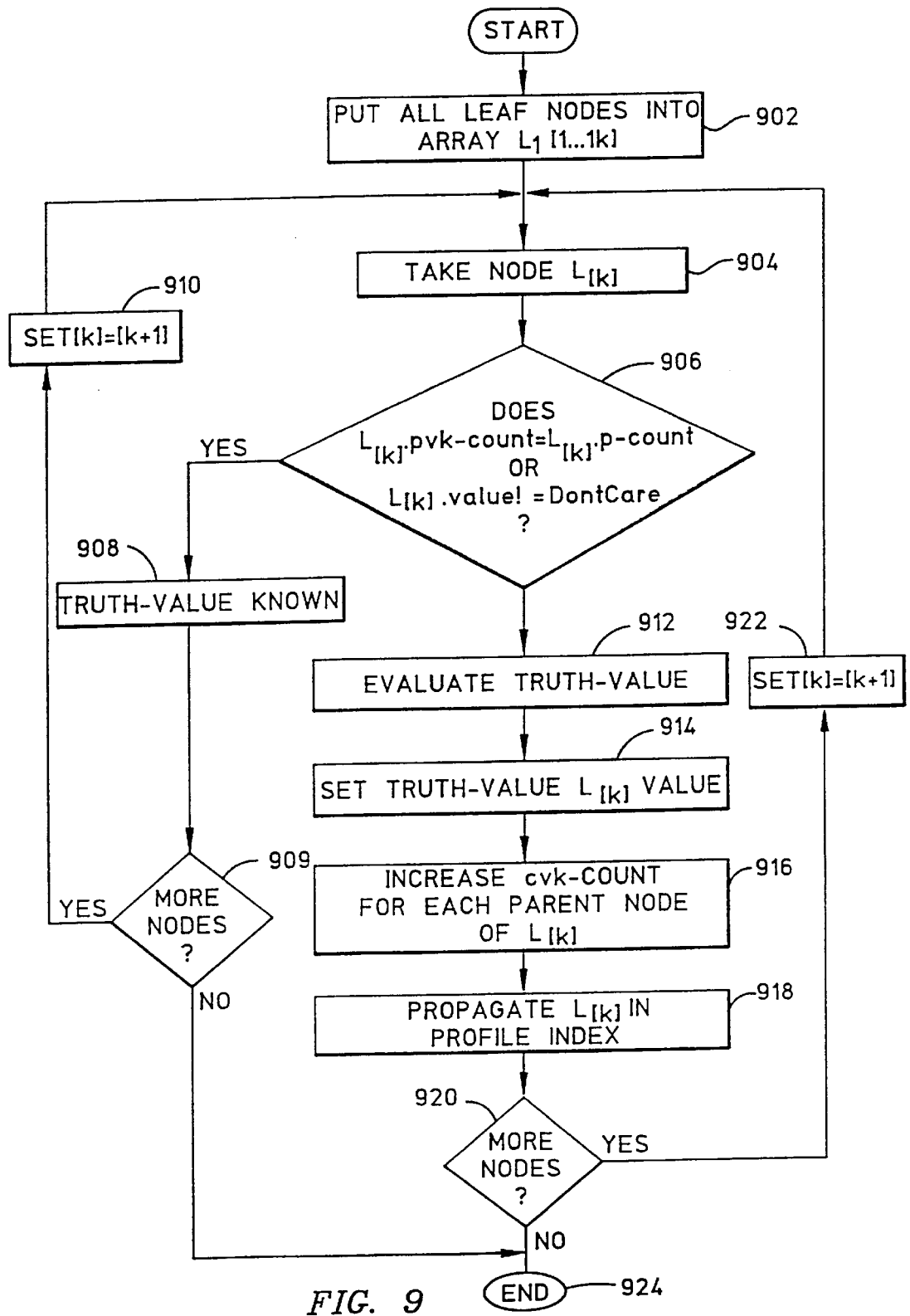
FIG. 9 is a flowchart of an operational sequence for evaluating a profile index in accordance with the invention.

Referring to FIG. 9, all the leaf nodes are put into an array L[1 ... n] in step 902 according to an order to be discussed below This method starts at node L[1] and continues until all the leaf nodes are processed. Assuming that the current leaf node being processed is L[k], the overall method is as follows.

In step 904, a node is selected and a check is made to see if a Truth-value is needed for L[k] in step 906. The check comprises whether (L[k].pvk-count==L[k].p-count) or (L[k].value!=DontCare). If so, it means that the truth-value for all of L[k]'s parent nodes are already known in step 908 and there is no need to compute the value of L[k]. If known, the method skips it over and processes and, if more nodes remain to be evaluated in step 909, then the next leaf node L[k+1], with k being set equal to k+1 in step 910, is evaluated and the method returns to step 904. If no further nodes remain, the method ends in step 924.

Otherwise, the Truth-value of L[k] is evaluated in step 912 using the methods discussed with regards to step 506 for evaluating basic predicates and set the new value to the L[k].value in step 914. The cvk-count for every parent node of L[k]. is also incrementally increased in step 916. Then the value of L[k] is propagated as far as possible in the profile index in step 918 to eliminate as many leaf nodes from further consideration as possible. If additional nodes remain to be evaluated in step 920, k is set equal to k+1 in step 922 and the method returns to step 904. Otherwise, the method ends in step 924.

As soon as the Truth-value of a leaf node is known, it cables the Truth-value of some of its parent nodes and ancestral nodes to have their Truth-value set. For example, if a parent node of L[k] is an AND node and the Truth-value of L[k] is False, it can immediately be determined that the Truth-value for that parent is False. Also, if a parent node of L[k] is an OR node and the Truth-value of L[k] is True, the Truth-value for that parent can be set to True. The value can be propagated further upwards in the same fashion. One benefit of such upward Truth-value propagation is that it allows the method to go downwards to the leaf nodes and increment their pvk-count so that some of them can be eliminated from further consideration when their pvk-count equals the p-count.

Figure 10A:
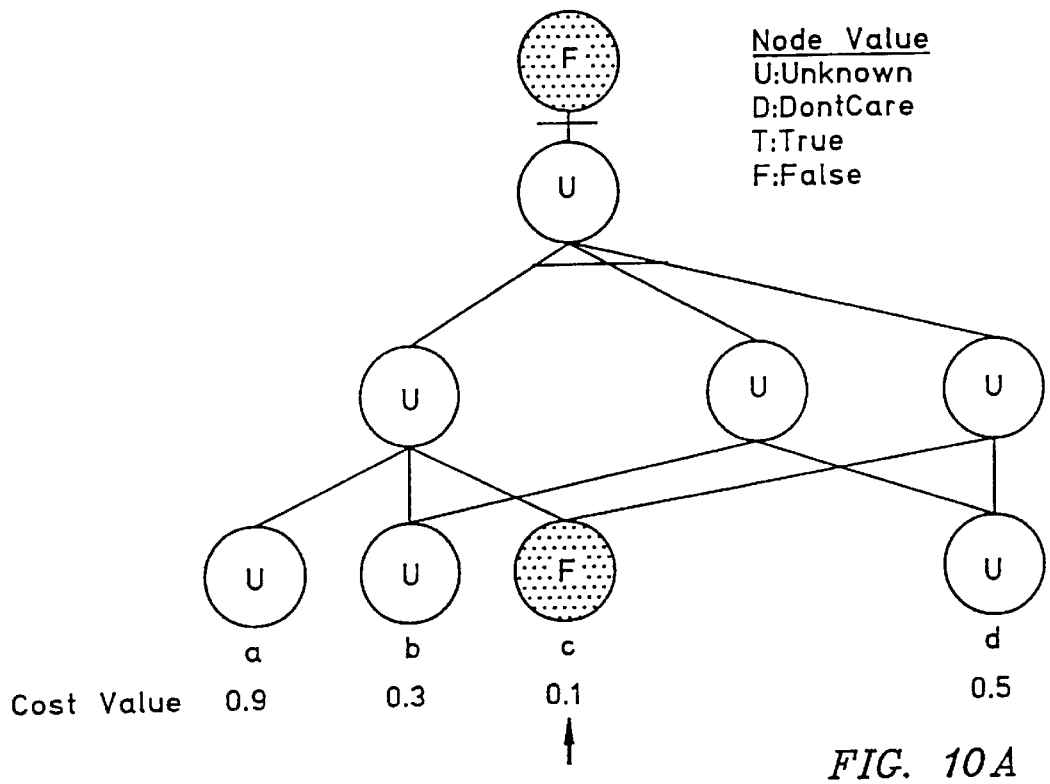
FIGS. 10A–10C are graphs used to explain the evaluation of a first, a second, and a third leaf node used to evaluate a profile index used in accordance with the invention.
Figure 10B:
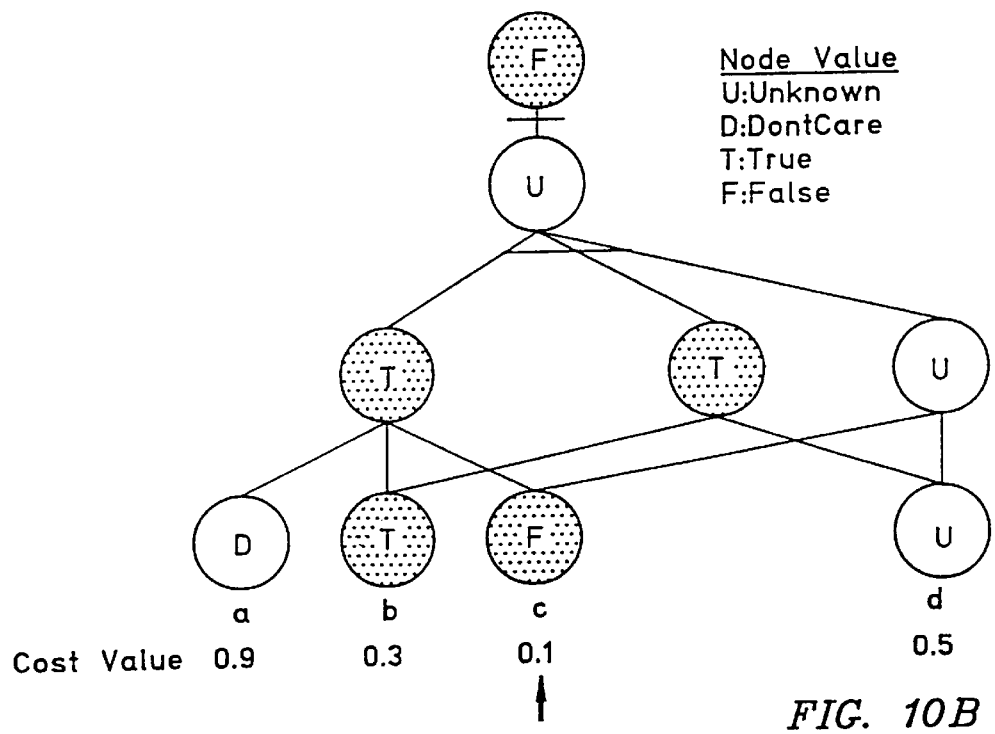
Figure 10C:
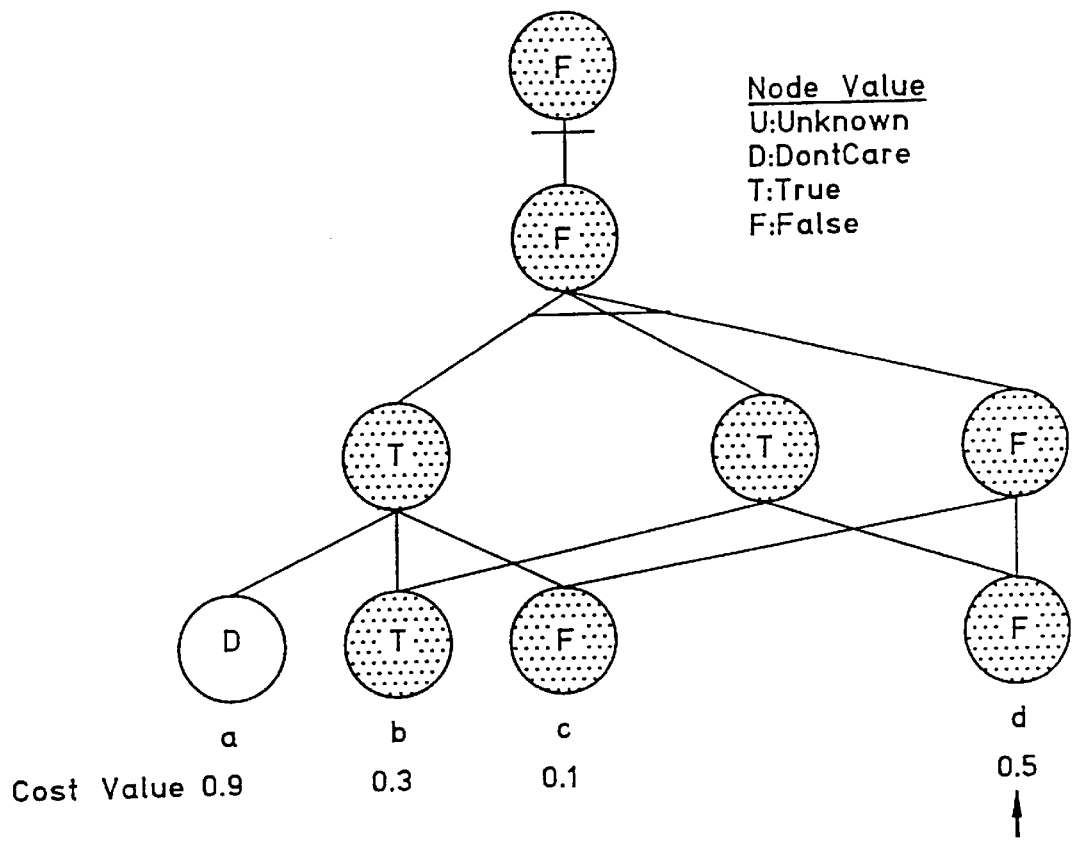

As an example, FIGS. 10A–10C evaluate a simple profile and illustrate the method. Again, to distinguish AND nodes visually from OR nodes, the arcs in the graph from an AND node are joined by a horizontal line. Assume the Root node to be an AND node with its value forced to be False. Let a, b, c, d be the basic predicates and a profile. Table 1 below shows the Truth-values and the computational costs of the basic predicates.

TABLE 1

Key Attributes of Basic Predicates

| Predicate | Value | Credit | Cost |
|---|---|---|---|
| a | true | 0.9 | 0.9 |
| b | true | 0.3 | 0.3 |
| c | false | 0.1 | 0.1 |
| d | false | 0.5 | 0.5 |

The computation cost to evaluate a basic predicate is also annotated below each leaf node in FIGS. 10A–10C. Initially the values of all nodes except for the Root node are set to UnKnown. The evaluation begins with evaluating the profile index with node c since it has the lowest computational cost (see the arrow in FIG. 10A). The Truth-value of c is false and its parent nodes are OR nodes. Therefore, the Truth-value cannot be propagated upwards.

FIG. 10B shows the next step in evaluating the profile index. Leaf node b has a Truth-value of True and propagates the value upward to its parent node. As a result leaf node a does not have to be evaluated because the Truth-value of the parent node of a is already known, therefore, one evaluation of a basic predicate is saved.

A final step in the evaluation process is illustrated in FIG. 10C. Node d is evaluated to False and propagates this value to the parent node with UnKnown value. This parent node can be evaluated because all the child nodes have known values. Thereafter the same method is used to propagate the Truth-value further upwards.

This example illustrates the notion of upward and downward propagation. It also shows when the evaluation of leaf nodes can be skipped. The specific process of propagating Truth-values upward contains the following algorithms expressed in C-like pseudo code routines.

```
PropUp(node N) {
/* called when the truth-Value of N is just known */
    for (each parent P of node N) {
        if (P.value != UnKnown) {
            /* the value of P is already set */
            continue;
        }
        if ((N.value == True && P is an OR node) ||
            (N.value == False && P is an AND node)) {
            /* can propagate up to P now */
            N.pvk-count++;
            P.cvk-count++;
            P.value = N.value;
            /* need to propagate down from P now */
            PropDown(P);
            /* need to propagate up further from P */
            PropUp(P);
        } else {
            /* cannot propagate but can increase the */
            /* cvk-count for P */
            P.cvk-count++;
            if (P.cvk-count == P.c-count) {
                /* the value P is known now that */
                /* all its children are computed */
                P.value = N.value;
                N.pvk-count++;
                /* no need to propagate down from P */
                    /* need to propagate up further from P */
                PropUp(P);
            }
        }
    }
}
```

The specific steps in the downward propagation are the following:

```
PropDown(node N) {
/* called when the truth-value of N is just known */
    if (N is a leaf node) {
        if (N.value == UnKnown)
            N.value = DontCare;
    } else {
        for (each child C of N) {
            if (C is a leaf node or C.value != UnKnown)
                continue;
            C.pvk-count++;
            if (C.pvk-count == C.p-count) {
            /* the value of C can be set to DontCare */
            /* now since all its parent's value */
            /* are known */
                C.value = DontCare;
                PropDown(C); /* go down recursively */
            }
        }
    }
}
```

The entire process of matching one information item against all the user profiles is the following:

```
Match(Information Item I, ProfileIndex PI) {
    Init (PI);
    L = SortLeaf(PI); /* L is an array of leaf nodes
        from PI */
    for (int i = 1, i <= L.length(); i++) {
        if (L[i].value != UnKnown ||
            L[i].pvk-count == L[i].p-count))
                continue; /* no need to compute L[i] */
        L[i].value = evaluate(I, L[i].predicate);
                /* set True or False */
        PropUp(L[i]);
    {
    produceMatchResult(PI, I);
```

The initialization of PI in Init(PI) is just traversing PI in either BFS or DFS order and set each node's value to UnKnown and the pvk-count and cvk-count to 0.

The actions in produceMatchResult(PI) are just iterate through each of the level-1 nodes (each of them represents one or multiple user profiles) as described in the following routine:

```
produceMatchResult(ProfileIndex PI, Information-Item I) {
    for (each level-1 node N (child of the Root of PI)) {
        if (N.value == True) {
            /* I matches the profiles associated
                with N */
            for (each profile P in N.profiles) {
                create a tuple (I, P) and send
                    to the corresponding client;
            }
        }
    }
}
```

Figure 11:
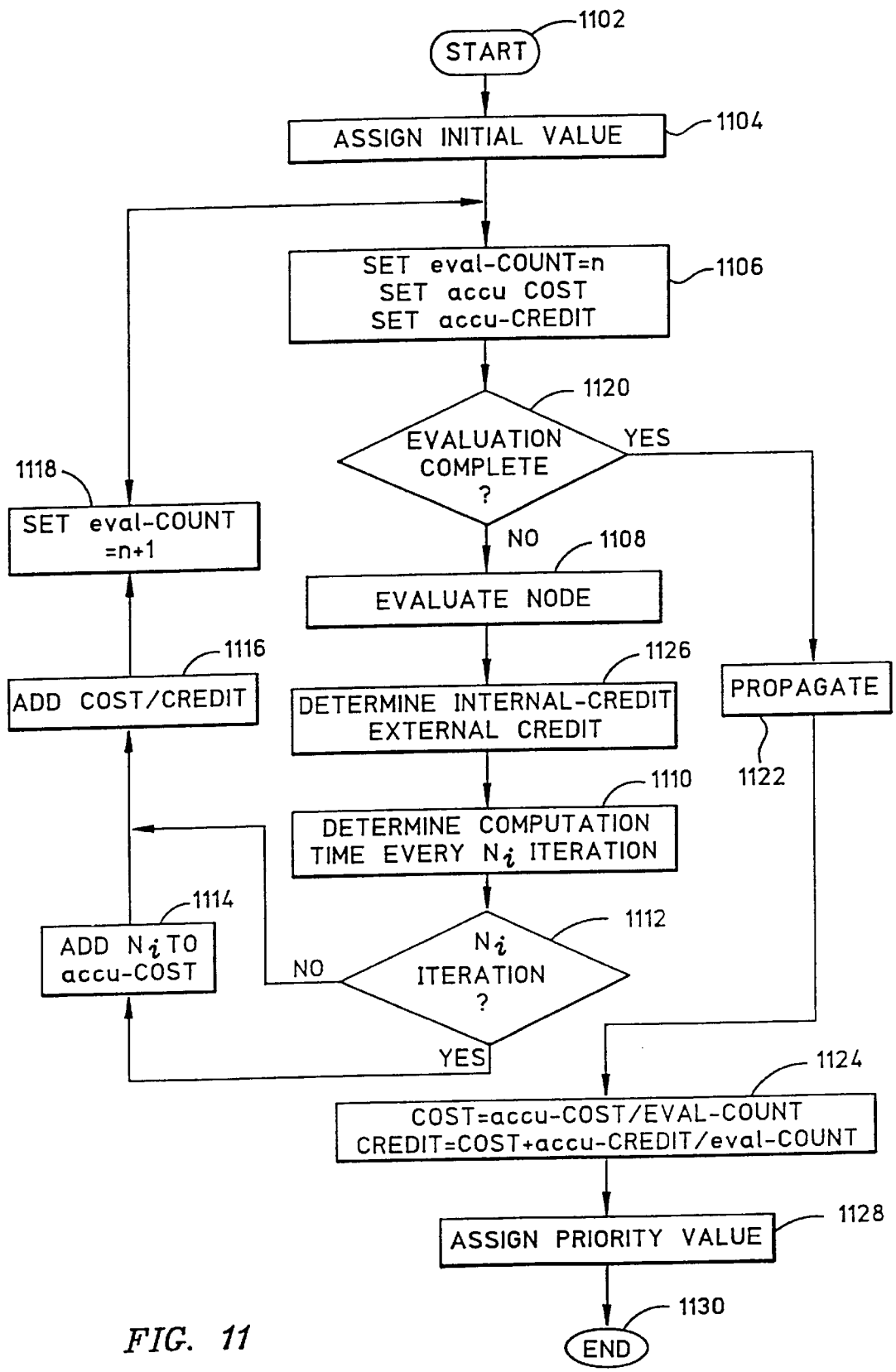
FIG. 11 is a flowchart of an operational sequence for matching profiles against indexed information items in accordance with the invention.

The method of FIG. 5 also includes dynamic cost/credit adjustments as shown in step 510, and explained in FIG. 11, and at step 1102.

3. Dynamic Cost/Credit Adjustment

The order in which basic predicates are evaluated is important to the overall performance of profile matching. The order is decided by both the cost and credit value of the leaf nodes of the profile index. Dynamic cost/credit adjustment to the cost and credit values of every leaf node achieves high performance in large-scale profiles. As such, the preferred method includes assigning an initial value, and then adjusting a profiles "cost" or "credit" based upon that value.

a. Assigning Initial Cost Value

The cost value of a predicate depends on the nature of the predicate itself and other factors, such as the characteristics of the information items the predicate is matched against, the environment in which the predicate is evaluated including the processor, memory, I/O, disk space and other system resources. To reflect the computation cost of a predicate, a record is dynamically made of the average computation cost for each predicate evaluation.

In order to initiate the method, there must be a reasonable initial cost value associated with each predicate in step 1104. As time goes on each predicate will receive an accurate average cost value through the dynamic adjustment process. But if wide discrepancies exist in the initial cost value, it will take longer for the method to accurately reflect true cost values and achieve higher performance. Therefore, relatively close cost values must be assigned to each basic predicate. For example predicates such as channel== Almaden-Events can be very easily checked and should be assigned very low initial cost value. On the other hand, predicates color==dark-red AND shape==oval can be rather expensive to compute and should be assigned relatively high initial cost value.

b. Dynamic Adjustment of Cost Value

To dynamically adjust the cost value of basic predicates, a record is made of the actual computation cost for every evaluation of a predicate in step 1106. In order to obtain the average cost, the following three additional attributes are associated with each leaf node:

a) eval-count: the number of times a leaf node has been evaluated;

b) accu-cost: the accumulated cost of a leaf node. Every time a node is evaluated, the recorded true cost is added to this attribute for the node; and c) accu-credit: the accumulated credit value of a leaf node. Every time a node receives credit, the credit value will be added to this attribute for the node. Its value assignment is discussed below.

With these attributes, the cost and credit attribute can be easily computed and a node evaluated in step 1108 using simple division. Each time an evaluation has completed eval-count is increased as shown in step 1118.

Recording the true computation cost of each evaluation of a predicate itself incurs computation cost, and the accumulated effect can be significant. The invention addresses this problem in steps 1110–1116 by taking samples once every N. times a particular predicate is evaluated. The value of $N_f$ can be configured according to the environment in which the system is deployed to achieve the best overall performance.

c. Dynamic Adjustment of Credit Value

Credit value is defined in the preferred embodiment as follows. The entire process of matching an information item against a profile index requires evaluating a value for every leaf node of the profile graph. The value of a leaf node can be computed in two ways: through the evaluation of the corresponding predicate, or the value of DontCare is assigned via the propagation process described earlier in this application. Two important aspects in the evaluation of a basic predicate are as follows. The cost of the predicate is the expense paid to get part or all of the profile matching process done. As a return for such expense, the value of one or more leaf nodes becomes known and the total sum of the cost of these nodes will be considered a credit attributed to the original predicate. In other words, the credit value of a leaf node represents the expected contribution it will make towards the entire process of assigning values to all of the leaf nodes.

Conceptually, the credit value of a leaf node consists of two parts as shown in step 1126: internal-credit and external-credit. The internal-credit of a predicate is the same as its cost value. This means that the evaluation of a leaf node will at least contribute to assigning a Truth-value to its own value. The external-credit of a predicate is the total cost of all the other leaf nodes that will be assigned the DontCare value as a result, averaged over time.

The method of attributing credit values to leaf nodes uses the accu-credit attribute to account for the accumulated external credit value of a leaf time. Its initial value is set to zero. Every time a leaf node N is evaluated, a log of how many leaf nodes will be assigned a DontCare value as a result is kept and he total sum of the cost of all those nodes is added to the accu-credit attribute of N. The value of accu-credit divided by eval-count is the average external-credit of a leaf node. The credit value of a leaf node is the sum of its internal-credit (which is always equal to the current cost value) and its average external credit. Expressed mathematically:

cost=accu-cost/eval-count and credit=cost+accu-credit/eval-count.

The process of attributing credit is done at the end of the evaluation of a leaf node in step 1120 and its related propagation in step 1122. The credit attribution process in step 1124 may need to give credit to leaf nodes other than the one that has just been evaluated. Consider an example where an internal rode M represents the AND Boolean operator with two child nodes a and b. Node M is also the child node of another internal OR node N which has leaf node c as its second child node. Suppose that node a is already evaluated to be True. By the time node b is evaluated to be True, the propagation mechanisms will assign a DontCare value to node c. However, the credit of c's cost should not be attributed to node b alone because node c can be skipped over because of the evaluation of both a and b. Each of them should be attributed half of the credit equally.

Figure 12A:
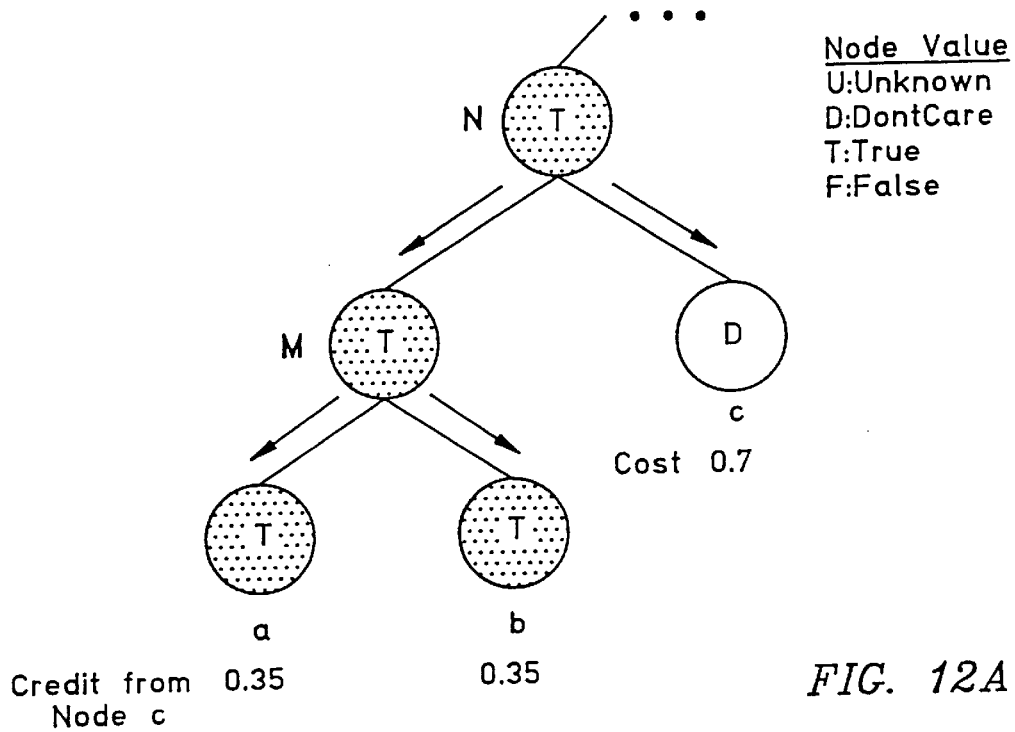
FIGS. 12A–12B are graphs used to explain the credit propagation mechanisms used in accordance with the invention.

FIG. 12A illustrates the above "skip-over" example. The process of attributing credit values can be done in two separate parts that are integrated with the Truth-value propagation process. The first part is integrated with the PropDown routine. It computes the total amount of credit value for all the leaf nodes that were assigned DontCare value. The following pseudo code shows the new PropDown routine extended with the method of counting total credit value.

```
int PropDown(node N) {
/* called when the truth-value of N is just known */
    int credit = 0;
    if (N is a leaf node) {
        if ((N.value == UnKnown)
            && (N.get_p_count() == 1)) {
            N.value = DontCare;
            credit = N.cost;
        }
    } else {
        for (each child C of N) {
            if (C.value != UnKnown)
                continue;
            C.pvk-count++;
            if (C.pvk-count == C.p-count) {
                /* the value of C can be set to DontCare */
```

-continued

```
                /* now since all its parent's values */
                /* are known */
                    C.value = DontCare;
                    credit += PropDown(C);
                    /* go down recursively */
            }
        }
    }
    return credit;
}
```

The routine now returns the total credit as a result of the downward propagation. Credit for leaf nodes is only returned with a single parent node. In a situation where more than one parent node of a leaf node is present, credit is not given because the credit cannot be assigned to a single source.

Figure 12B:
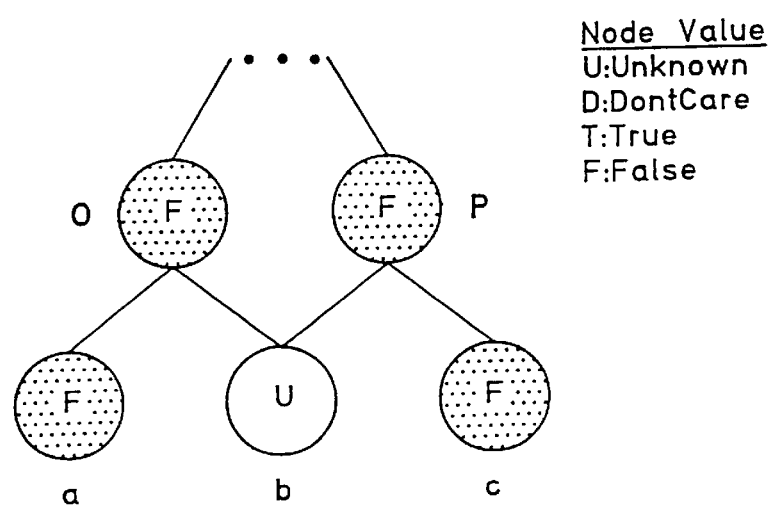
Figure 13A:
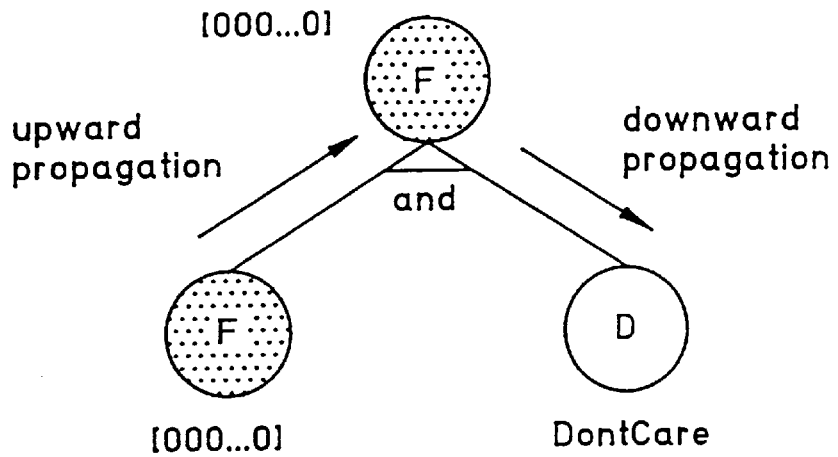
FIGS. 13A–13B illustrate the concept of upward and downward propagation practiced in accordance with the invention.
Figure 13B:
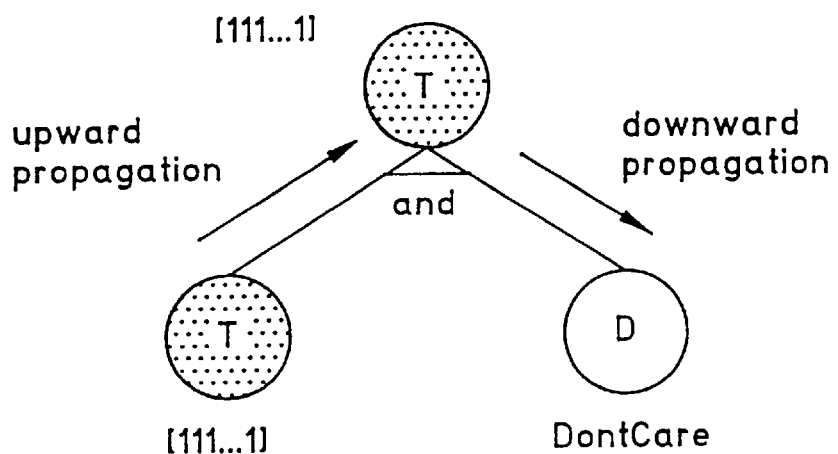

Consider FIG. 12B for an example. O and P are both AND nodes and have the children a, b and c. If leaf node a evaluates to False, its Truth-value can be propagated up to node O and set to False. The Truth-value of O cannot be propagated downward to node b because b has another parent node. Therefore, node a cannot claim any credit for node b.

Another aspect of the cost/credit method attributes the total credit from downward propagation to the leaf nodes of node N that contributes to setting a Truth-value to N and the DontCare value to some of its descendants. The specific process is described in the following pseudo code routine:

```
DistributeCredit(node N, int credit) {
    if (N is a leaf node) {
        N.accu-credit += credit;
    } else {
        int contribute_children_count = 0;
        for (each child C of N)
            if (C.value == N.value)
                contribute_children_count++;
        int average_credit = credit / contribute_children_count;
        for (each child C of N)
            if (C.value == N.value)
                DistributeCredit(C, average_credit);
    }
}
```

With the extended PropDown and DistributeCredit routines, the entire process of credit attribution can be done by replacing the call of PropDown(P) with DistributeCredit (P, PropDown(P)) in the original PropUp routine.

d. Leaf Node Evaluation Order

Once all of the dynamically adjusted cost and credit values for every leaf node have been ascertained, the evaluation order of all the leaf nodes is decided in step 1128. Before the method of matching an information item against the profile index starts in step 512 of FIG. 5, a priority value is assigned to each of the leaf nodes. The priority value is computed by credit/cost, which means the average contribution of this leaf node on a unit of computation cost. For nodes with equal priority value, the nodes are ordered by the cost value alone in increasing order. Evaluation of the cheap nodes first is preferred in the hope that they will cause the expensive nodes to be skipped over.

Depending on the nature of the information items and predicates, other ordering functions for the leaf nodes may be used. For example, one could order the leaf nodes according to their cost values in increasing order. Leaf nodes with the same cost value could be sorted according to their credit values in decreasing order. This alternative method approach focuses more on the actual cost of every leaf node.

The evaluation order during the process of matching against one information item remains the same despite that many of the leaf nodes will have different cost and credit values during the process. After the process is done, the array is re-ordered so that it contains all the leaf nodes with the new priority value for matching against the next information item.

Also, the data structure for presenting a linear sequence of all the leaf nodes does not have to be an array. An array, requires a sorting operation every time a new information item is matched. For performance reasons, alternative data structures such as a heap can be used to avoid the cost of the frequent sorting of all the leaf nodes.

e. False Value

In the cases where there is a group of leaf nodes with identical priority values as well as identical cost values, leaf nodes whose parent node is an AND operator will be evaluated ahead of those whose parent is an OR operator in the preferred embodiment. This makes the method more efficient because subscribers to a webcasting system gradually improve their profiles so that they will only get the information they need. As a result, under normal circumstances, each incoming information item only matches a small percentage of the profiles in the profile index. This means that most of the predicates in the profile index will be evaluated to False. Therefore, it makes sense to favor the False value so that it can be propagated faster and eliminate more leaf nodes from the profile index. After priority values are assigned the method ends in step 1130. After a cost/credit adjustment has been made, a profile may be matched to desired information as reflected in step 512 of FIG. 5.

4. Matching Profiles Against Indexed Information Items

Another important aspect of this invention is a method for matching against indexed information items within the same dynamic cost/credit-based profile indexing and matching framework as shown in FIG. 14. In practice, many of the important data sources fed into a webcasting system are often indexed for providing other information services. The profile matching mechanism of the preferred embodiment of the present invention fully exploits the indices to further reduce performance cost, beginning in step 1202 when a database is accessed in step 1204.

For example, news articles posted in a group announcing events such as talks and seminars can be compiled into a webcasting channel automatically fed to subscribers. However, articles posted in that group can also be indexed and made available for the users to search for a particular kind of event. This part of the invention describes a new technique within the dynamic cost/credit-based profile indexing/matching framework that effectively utilizes the data indices to improve the performance of profile matching.

Suppose that the set of indexed data objects is $S=\{obj_1, obj_2, \ldots, obj_n\}$ and the corresponding index for S is denoted Idx(S), which contains data structures for speeding up search operations on objects in S. In the common cases, Idx(S) supports a set of typical query operations so when a particular query Q is applied on Idx(S), it will return a subset of S denoted Q(S), where each object in Q(S) satisfies the conditions required by Q. The preferred embodiment only considers the kind of indices that support all the basic query predicates of the webcasting query language. However another embodiment uses a converter to translate the webcasting query language into non-supported language, and vis-a-versa.

Matching against indexed data within the dynamic cost/credit-based profile indexing/matching framework of the preferred embodiment extends the previously described algorithms and lets each basic predicate be applied on an Idx(S) rather than a specific object.

Specific extensions include each leaf node evaluation being applied on the index Idx(S) in step 1210. As a result the return value of such an evaluation is no longer the Truth-value of True or False. Instead, the return value becomes a subset of S containing all the objects that would have returned TRUE for the predicate associated with the leaf node.

If the subset is empty, the method ends in step 1226. An efficient representation of such evaluation result is to use a bit vector of N bits, where N is the number of objects in S. Each bit in the vector uniquely identifies an object in S. Therefore, the evaluation result of a leaf node in this embodiment is represented by a bit vector where each bit set at 1 corresponds to T and an object is S that satisfies the predicate for the leaf node.

Another extension of the preferred method, using the bit vector representation of the valuation result, the Boolean operations of AND, OR, and NOT for each internal node are correspondingly performed by the bit-wise AND, OR, and NOT operations in step 1216. In addition, each internal node accumulates evaluation results from its children during the valuation process. An AND node will maintain a bit vector that is the result of accumulated bit-wise AND from all its children that has been evaluated so far. Similarly, an OR node will maintain a bit vector that is the result of accumulated bit-wise OR from all its evaluated children. When all the children are evaluated, the accumulated value becomes the final evaluation result of the internal node as shown in step 1220.

Further, the cost/credit-based profile matching method of the preferred embodiment can be applied to matching indexed data. The basic idea is to consider a 1-vector, a bit vector where every bit is set to be 1, to be equivalent to the Truth-value of True. Similarly, an 0-vector, where every bit of the vector is set is 0, is equivalent to the Truth-value of False. The 1-vector can pass through an OR node and the 0-vector can pass through an AND node. For an OR node, as soon as its accumulated value becomes a 1-vector, the need to evaluate its remaining un-evaluated children is eliminated in task 1214 because they cannot change the profile-matching outcome. Similarly, for an AND node, as soon as its accumulated value becomes an 0-vector, the need to evaluate the remaining un-evaluated children is eliminated. Those nodes will therefore be marked as DontCare in step 1218, as illustrated in FIG. 12.

Finally, the preferred method for dynamically adjusting the credit values of each leaf node may also be extended to matching indexed data. To describe the new formula of adjusting predicate cost value, consider the case of an OR node O whose accumulated evaluation result is a 1-vector. Assume that node O has M children C1, C2, . . . , CM that have already been evaluated. Also assume that the total credit value attributed to node O is C. To describe the process of assigning credit value to each of the C1, C2, . . . , CM, reference is made to Table 2 where each row corresponds to a child node and each column corresponds to a position bit vector representing the evaluation result of corresponding child node. The values are present in a $V_{i,j}$ format

TABLE 2

| | Child Needs | | |
|---|---|---|---|
| | Bit 1 | Bit 2 | Bit N |
| $C_1$ | $V_{1,1}$ | $V_{1,2}$ | $V_{1,N}$ |
| $C_2$ | $V_{2,1}$ | $V_{2,2}$ | $V_{2,N}$ |
| $C_M$ | $V_{M,1}$ | $V_{M,2}$ | $V_{M,N}$ |
| Bit Count | $BC_1$ | $BC_2$ | $BC_N$ |

Each value $V_{i,j}$ is either 1, when node $C_i$'s evaluation result has a value 1 set at position j. The Bit Count row of the table is a summary for each position in the bit vector where $BC_i$ is the sum of values from column i. The contribution of node Ci for setting j's position of the bit vector to 1 is $$\frac{V_{i,j}}{BC_j}.$$

The total credit for Ci denoted as C(Ci) is $$\frac{C \cdot \sum_{j=1}^{N} \frac{V_{i,j}}{BC_j}}{BitSum},$$

where BitSum is the total number of bits set to 1 in the evaluation result of node O (which is N in this example case). Note that the total sum of $C(C_1), \ldots, C(C_N)$ is C.

The credit attribution process discussed above may be recursive in one embodiment. Any child node in the above discussion itself can be an internal node. This process is recursively applied to all the leaf nodes to assure they receive the credit they deserve. However, the credit attribution process does not retain any value for internal nodes because the purpose of assigning credits is to dynamically adjust the cost value of each leaf node. Further, the credit value for leaf node is additive during the evaluation process of one indexed data collection. A single leaf node may receive credits from its different parent nodes. Finally, although the example discussion above is for an OR node, the same process applies equally to an AND node except that the 0 bits in the table are counted by the method instead of the 1 bits.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for matching a user profile with desired data, the method comprising:
   building a profile index, wherein the profile index includes a collection of user profiles including predicates;
   identifying predicates shared by user profiles; and
   evaluating the predicates, wherein each predicate is evaluated once and the evaluation includes matching each predicate of the profile collection against data items.

2. The method recited in claim 1 including evaluating the shared predicates by priority, wherein most-shared predicates have a higher priority than lesser-shared predicates.

3. The method recited in claim 2, evaluating the predicates further comprising:
   dynamically monitoring the evaluation of each predicate;
   assigning an evaluation cost to each predicate based upon the monitoring, wherein the cost of a cheap predicate requires less evaluation time and the cost of an expensive predicate requires more evaluation time; and
   evaluating the cheap predicates before the expensive predicates.

4. The method recited in claim 2, wherein evaluating a predicate against a data item further comprises:
   accessing an index for the data items, the data items having contents and the index comprising a list of the contents; and
   evaluating a predicate against the list of the contents.

5. The method recited in claim 4, wherein evaluating the predicates further comprises:
   dynamically monitoring the evaluation of each predicate;
   assigning an evaluation cost to each predicate based upon the monitoring, wherein the cost of a cheap predicate requires less evaluation time and the cost of an expensive predicate requires more evaluation time; and
   evaluating the cheap predicates before the expensive predicates.

6. The method recited in claim 1, wherein evaluating the predicates further comprises:
   dynamically monitoring the evaluation of each predicate;
   assigning an evaluation cost to each predicate based upon the monitoring, wherein the cost of a cheap predicate requires less evaluation time and the cost of an expensive predicate requires more evaluation time; and
   evaluating the cheap predicates before the expensive predicates.

7. The method recited in claim 6, wherein evaluating a predicate against a data item further comprises:
   accessing an index for the data items, the data items having contents and the index comprising a list of the contents; and
   evaluating a predicate against the list of the contents.

8. A signal-bearing medium tangibly embodying a program of machine-readable instructions executable by a digital processing apparatus to perform a method for matching a user profile with desired data, said method comprising:
   building a profile index, wherein the profile index includes a collection of user profiles including predicates;
   identifying predicates shared by user profiles; and
   evaluating the predicates, wherein each predicate is evaluated once and the evaluation includes matching each predicate of the profile collection against data items.

9. The signal-bearing medium embodying a program for the method recited in claim 8, the method including evaluating the shared predicates by priority, wherein most-shared predicates have a higher priority than lesser-shared predicates.

10. The signal-bearing medium embodying a program for the method recited in claim 9, the method step of evaluating the predicates further comprising:
   dynamically monitoring the evaluation of each predicate;
   assigning an evaluation cost to each predicate based upon the monitoring, wherein the cost of a cheap predicate requires less evaluation time and the cost of an expensive predicate requires more evaluation time; and
   evaluating the cheap predicates before the expensive predicates.

11. The signal-bearing medium embodying a program for the method recited in claim 9 the method step of evaluating a predicate against a data item further comprising:

accessing an index for the data items, the data items having contents and the index comprising a list of the contents; and evaluating a predicate against the list of the contents.

12. The signal-bearing medium embodying a program for the method recited in claim 11, the method step of evaluating the predicates further comprises:

dynamically monitoring the evaluation of each predicate;

assigning an evaluation cost to each predicate based upon the monitoring, wherein the cost of a cheap predicate requires less evaluation time and the cost of an expensive predicate requires more evaluation time; and evaluating the cheap predicates before the expensive predicates.

13. The signal-bearing medium embodying a program for the method recited in claim 8, the method step of evaluating the predicates further comprising:

dynamically monitoring the evaluation of each predicate;

assigning an evaluation cost to each predicate based upon the monitoring, wherein the cost of a cheap predicate requires less evaluation time and the cost of an expensive predicate requires more evaluation time; and evaluating the cheap predicates before the expensive predicates.

14. The signal-bearing medium embodying a program method recited in claim 10, the method step of evaluating a predicate against a data item further comprising:

accessing an index for the data items, the data items having contents and the index comprising a list of the contents; and evaluating a predicate against the list of the contents.

15. An apparatus to match a user profile with desired data, the apparatus comprising:

a webcasting system, the system including:

a profile handler;

a profile matcher;

a profile database;

an data item fetcher;

a processor, wherein the processor is capable of executing instructions to:

build a profile index, wherein the profile index includes a collection of user profiles including predicates;

identify predicates shared by user profiles; and evaluate the predicates, wherein each predicate is evaluated once and the evaluation includes matching each predicate of the profile collection against data items.

16. The apparatus recited in claim 15, wherein the processor is further capable of executing instructions to evaluate the shared predicates by priority, wherein most-shared predicates have a higher priority than lesser-shared predicates.

17. The apparatus recited in claim 16, wherein the processor is further capable of executing instructions to:

dynamically monitor the evaluation of each predicate;

assign an evaluation cost to each predicate based upon the monitoring, wherein the cost of a cheap predicate requires less evaluation time and the cost of an expensive predicate requires more evaluation time; and evaluate the cheap predicates before the expensive predicates.

18. The apparatus recited in claim 16, wherein the processor is further capable of executing instructions to:

access an index for the data items, the data items having contents and the index comprising a list of the contents; and evaluate a predicate against the list of the contents.

19. The apparatus recited in claim 18, wherein the processor is further capable of executing instructions to:

dynamically monitor the evaluation of each predicate;

assign an evaluation cost to each predicate based upon the monitoring, wherein the cost of a cheap predicate requires less evaluation time and the cost of an expensive predicate requires more evaluation time; and evaluate the cheap predicates before the expensive predicates.

20. The apparatus recited in claim 15, wherein the processor is further capable of executing instructions to:

dynamically monitor the evaluation of each predicate;

assign an evaluation cost to each predicate based upon the monitoring, wherein the cost of a cheap predicate requires less evaluation time and the cost of an expensive predicate requires more evaluation time; and evaluate the cheap predicates before the expensive predicates.

21. The apparatus recited in claim 20, wherein the processor is further capable of executing instructions to:

access an index for the data items, the data items having contents and the index comprising a list of the contents; and evaluate a predicate against the list of the contents.

22. A method for matching a user profile with selected data, the method comprising:

a means for building and maintaining a profile index, wherein the profile index includes a collection of user profiles including predicates;

a means for evaluating a predicate;

a means for evaluating the predicates, wherein each predicate is evaluated once based upon its evaluation cost;

a means for making an adjustment to the evaluation cost;

a means for matching the predicates with desired data; and a means for pushing the data to a user.

\* \* \* \* \*